United States Patent
Otake

(10) Patent No.: US 10,377,366 B2
(45) Date of Patent: Aug. 13, 2019

(54) VEHICLE CONTROL DEVICE

(71) Applicant: TOYOTA JIDOSHA KABUSHIKI KAISHA, Toyota-shi (JP)

(72) Inventor: Hirotada Otake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/647,768

(22) Filed: Jul. 12, 2017

(65) Prior Publication Data
US 2018/0037216 A1   Feb. 8, 2018

(30) Foreign Application Priority Data

Aug. 4, 2016 (JP) ................................. 2016-153579

(51) Int. Cl.
| | | |
|---|---|---|
| *B60W 10/20* | (2006.01) | |
| *B60W 30/12* | (2006.01) | |
| *B60W 30/18* | (2012.01) | |
| *B60W 40/08* | (2012.01) | |
| *B60K 28/06* | (2006.01) | |

(52) U.S. Cl.
CPC ............ *B60W 10/20* (2013.01); *B60W 30/12* (2013.01); *B60W 30/18109* (2013.01); *B60K 28/06* (2013.01); *B60W 30/18145* (2013.01); *B60W 2040/0818* (2013.01); *B60W 2540/26* (2013.01)

(58) Field of Classification Search
CPC combination set(s) only.
See application file for complete search history.

(56) References Cited

U.S. PATENT DOCUMENTS

| | | | |
|---|---|---|---|
| 2006/0025918 A1 | 2/2006 | Saeki | |
| 2011/0015850 A1* | 1/2011 | Tange | B60W 30/12 701/116 |
| 2016/0107644 A1* | 4/2016 | Eigel | B60W 50/14 701/70 |
| 2017/0232973 A1 | 8/2017 | Otake | |
| 2018/0111628 A1* | 4/2018 | Tamagaki | B60Q 1/46 |

FOREIGN PATENT DOCUMENTS

| | | |
|---|---|---|
| JP | 2006-315491 | 11/2006 |
| JP | 2008-195402 | 8/2008 |
| JP | 4172434 | 10/2008 |

(Continued)

*Primary Examiner* — Thomas G Black
*Assistant Examiner* — Ana D Thomas
(74) *Attorney, Agent, or Firm* — Oblon, McClelland, Maier & Neustadt, L.L.P.

(57) ABSTRACT

A driver is prevented from carrying out hands-free driving while lane keeping assist control is being carried out, thereby appropriately determining an abnormal state of the driver. When a steering wheel no-operation state continues for a first period or more, a driving support ECU sets a control mode of LKA to a "weaker mode", thereby decreasing a control amount of the LKA. As a result, an own vehicle swerves within a travel lane, and the driver neglecting the steering wheel operation can be prompted to operate the steering wheel. Further, when the no-driving operation state continues for a second period or more, the driving support ECU establishes determination that the driver is in an abnormal state, returns the LKA to a "normal mode", and decelerates and stops the own vehicle.

18 Claims, 12 Drawing Sheets

(56) References Cited

FOREIGN PATENT DOCUMENTS

| | | |
|---|---|---|
| JP | 2009-73462 | 4/2009 |
| JP | 2009-190464 | 8/2009 |
| JP | 2009-248599 A | 10/2009 |
| JP | 4349210 | 10/2009 |
| JP | 2010-6279 | 1/2010 |
| JP | 4929777 | 5/2012 |
| JP | 2013-152700 | 8/2013 |
| JP | 2014-091380 A | 5/2014 |
| JP | 2014-148293 | 8/2014 |
| JP | 2016-074253 A | 5/2016 |

* cited by examiner

VEHICLE CONTROL DEVICE

BACKGROUND OF THE INVENTION

1. Field of the Invention

The present invention relates to a vehicle control device configured to handle a case where a driver falls into an abnormal state where the driver has lost capability to drive a vehicle.

2. Description of the Related Art

Hitherto, there have been proposed devices configured to determine whether or not the driver has fallen into the abnormal state where the driver has lost the capability to drive the vehicle (e.g., a drowsy driving state and a state where bodily functions have stopped) and decelerate the vehicle when such determination is made (for example, refer to Japanese Patent Application Laid-open No. 2009-73462).

The "abnormal state where the driver has lost the capability to drive the vehicle" is hereinafter also simply referred to as "abnormal state", and the "determination of whether or not the driver is in the abnormal state" is hereinafter also simply referred to as "abnormality determination for the driver".

For example, when a no-operation state where the driver is predicted not to be carrying out a driving operation continues for a predetermined period, the driver can be determined to be in the abnormal state. However, when lane keeping assist control, which is one function for supporting a steering wheel operation by the driver, is being carried out, the driver may put too much confidence in the lane keeping assist control and neglect the steering wheel operation. In other words, the driver may carry out hands-free driving. In such a case, even when the driver is not actually in the abnormal state, the driver may be determined to be in the abnormal state. Moreover, when the lane keeping assist control continues under the state where the wrong determination is made, the driver further puts confidence in the lane keeping assist control, or misunderstands that the system permits the hands-free driving, resulting in continuation of the hands-free driving.

SUMMARY OF THE INVENTION

The present invention has been made in view of the above-mentioned problem, and therefore has an object to prevent a driver from carrying out hands-free driving, thereby appropriately determining an abnormal state of the driver.

In order to attain the above-mentioned object, a feature of a vehicle control device according to one embodiment of the present invention resides in that the vehicle control device includes:

lane keeping assist means (10 and 60) for recognizing a road ahead of a vehicle to set a target travel line, calculating a lane keeping assist control amount for carrying out driving support for a driver so that the vehicle travels along the target travel line, and carrying out steering control for the vehicle based on the lane keeping assist control amount;

preliminary determination means (10, S13, and S14) for determining whether or not a hands-free state, where the driver is predicted not to operate a steering wheel, has continued for a period equal to or more than a preliminary abnormality determination period set in advance under a state where the steering control is carried out by the lane keeping assist means, and preliminarily determining that the driver is in an abnormal state of having lost capability to drive the vehicle when the hands-free state has continued for a period equal to or more than the preliminary abnormality determination period;

control amount change means (10, S15, and S42) for changing the lane keeping assist control amount so that the vehicle travels inside a lane under a state where lane keeping performance of the vehicle traveling along the target travel line is decreased when the preliminary determination is made by the preliminary determination means;

abnormality establishment means (10 and S18) for determining (10, S16, S17, and S32) whether or not a state where the driver is predicted to be in the abnormal state has continued until a set timing set in advance after the lane keeping assist control amount is changed by the control amount change means, and establishing the determination that the driver is in the abnormal state when the state where the driver is predicted to be in the abnormal state has continued until the set timing; and abnormality-time driving control means (10, 819, S20, S33, S43, S52, 30, and 40) for carrying out abnormality-time driving control, which is driving control for risk avoidance, based on the establishment of the determination that the driver is in the abnormal state.

According to the one embodiment of the present invention, the lane keeping assist means recognizes the road ahead of the vehicle (for example, recognizes white lines on both sides of a road) to set the target travel line, calculates the lane keeping assist control amount for carrying out driving support for the driver so that the vehicle travels along the target travel line, and carries out steering control for the vehicle based on the lane keeping assist control amount. The steering control carried out based on this lane keeping assist control amount is referred to as "lane keeping assist control".

The preliminary determination means determines whether or not the hands-free state, where the driver is predicted not to operate the steering wheel, has continued for a period equal to or more than the preliminary abnormality determination period set in advance under a state where the steering control is carried out by the lane keeping assist means, and preliminarily determines that the driver is in an abnormal state of having lost capability to drive the vehicle when the hands-free state has continued for a period equal to or more than the preliminary abnormality determination period. When the driver has actually fallen into the abnormal state, the state where the steering wheel is not operated continues, and thus the preliminary determination that the driver is in the abnormal state is made. However, when a normal driver (a driver who is capable of driving) is neglecting the steering wheel operation, the preliminary determination that the driver is in the abnormal state is also made.

It is necessary for the driver who is so negligent as to neglect the steering wheel operation to hold the steering wheel. Moreover, it is possible to avoid the determination that such a driver is in the abnormal state by making the driver hold the steering wheel.

To address this issue, the control amount change means changes the lane keeping assist control amount so that the vehicle travels inside a lane under a state where the lane keeping performance of the vehicle traveling along the target travel line is decreased when the preliminary determination is made by the preliminary determination means. In this way, the vehicle no longer travels on the travel line desired for the driver, and the driver is thus prompted to carry out the steering wheel operation. As a result, the driver, who has neglected the steering wheel operation, starts the steering wheel operation, and no longer puts too much confidence in the lane keeping assist control. Moreover, for example, when the vehicle is caused to travel to swerve within the lane, a dozing driver may be awakened based on this motion of the vehicle.

The abnormality establishment means determines whether or not the state where the driver is predicted to be in the abnormal state has continued until the set timing set in advance after the lane keeping assist control amount is changed by the control amount change means, and establishes the determination that the driver is in the abnormal state when the state where the driver is predicted to be in the abnormal state has continued until the set timing. In this case, the abnormality establishment means detects the "state where the driver is predicted to be in the abnormal state", and, as the detection of this state, detection of a state (no-driving operation state) where the driver does not carry out the operation for driving the vehicle including, for example, the operation of the steering wheel, may be employed. Moreover, for example, so-called "driver monitor technology" disclosed in Japanese Patent Application Laid-open No. 2013-152700 and the like may be employed. Moreover, detection of a state where the driver does not carry out a press operation on a confirmation button even when the driver is prompted to carry out the press operation on the confirmation button and the like may be employed.

Moreover, as the timing as in "until the set timing set in advance", a timing at which an arbitrary event occurs may be set, and timings such as "until a set continuous period set in advance elapses", "until the vehicle speed decreases to a vehicle speed equal to or less than a set vehicle speed", or "until the vehicle speed decreases to a vehicle speed equal to or less than a set vehicle speed and a set continuous period set in advance elapses" may be employed.

As a result, a driver who is neglecting the steering wheel operation and is carrying out the hands-free driving can be excluded, and the determination that the driver is in the abnormal state can be established. The abnormality-time driving control means carries out the abnormality-time driving control, which is the driving control for risk avoidance, based on the establishment of the determination that the driver is in the abnormal state.

As a result, according to the one embodiment of the present invention, the driver can be prevented from carrying out the hands-free driving, thereby appropriately determining the abnormal state of the driver.

In this case, the abnormality-time driving control means may be configured to decelerate the vehicle at a target deceleration so as to stop the vehicle (S20 and S33). As a result, the vehicle can be stopped to secure safety.

Further, the abnormality-time driving control means may be configured to change the lane keeping assist control amount from a previous lane keeping assist control amount decreased in the lane keeping performance to a lane keeping assist control amount increased in the lane keeping performance (819, S43, and S52). As a result, the vehicle can be caused to travel along the target travel line, thereby avoiding collision with another vehicle traveling in an adjacent lane, or other troubles.

A feature of one embodiment of the present invention resides in that the control amount change means is configured to decrease (S15 and S42) the lane keeping assist control amount from a lane keeping assist control amount before the preliminary determination is made when the preliminary determination means makes the preliminary determination.

According to the one embodiment of the present invention, when the preliminary determination means makes such a preliminary determination that the driver is in the abnormal state, the control amount change means decreases the lane keeping assist control amount from the lane keeping assist control amount before the preliminary determination is made. As a result, the vehicle less is less likely to travel along the target travel line, and comes to swerve within the lane. Thus, the driver who has not lost driving capability reacts in some way to the change in the travel state of the vehicle. For example, the driver starts a driving operation, for example, a steering wheel operation, a brake pedal operation, or an accelerator pedal operation. Alternatively, an intentional change in the posture of the driver and the like occur. Thus, the determination of the abnormal state of the driver can be established based on the presence/absence of the reaction of the driver. As a result, when the state where there is no reaction from the driver continues until the abnormality establishment condition is satisfied, the determination that the driver is in the abnormal state can be established.

A feature of one embodiment of the present invention resides in that the lane keeping assist means is configured to calculate the lane keeping assist control amount ($\theta LKA^*$) including: a curvature control amount ($K1 \times v$) calculated based on a curvature of the target travel line; a distance difference control amount ($K3 \times Dc$) calculated based on a distance difference in a road width direction between the target travel line and a position of the vehicle; and a yaw angle difference control amount ($K2 \times \theta y$) calculated based on a difference angle between a direction of the target travel line and a direction of the vehicle, and the control amount change means is configured to decrease the lane keeping assist control amount by decreasing the distance difference control amount and the yaw angle difference control amount are more than the curvature control amount.

According to the one embodiment of the present invention, the lane keeping assist control amount calculated by the lane keeping assist means includes the curvature control amount calculated based on the curvature of the target travel line, the distance difference control amount calculated based on the distance difference in the road width direction between the target travel line and the position of the vehicle, and the yaw angle difference control amount calculated based on the difference angle between the direction of the target travel line and the direction of the vehicle. The control amount change means decreases the lane keeping assist control amount by decreasing the distance difference control amount and the yaw angle difference control amount more than the curvature control amount. Thus, the vehicle can be caused to appropriately swerve within the lane so that the vehicle does not deviate outside of the lane.

In this case, the control amount change means may be configured to decrease the distance difference control amount and the yaw angle difference control amount, and to avoid decreasing the curvature control amount.

A feature of one embodiment of the present invention resides in that the control amount change means is configured to avoid changing the lane keeping assist control amount when a recognition level at which the lane keeping assist means is capable of recognizing the road is equal to or less than a threshold value.

According to the one embodiment of the present invention, the control amount change means avoids changing the lane keeping assist control amount when the recognition level at which the lane keeping assist means is capable of recognizing the road is equal to or less than the threshold value. As the recognition level at which the road can be recognized, a distance to a recognized white line and the like may be used. In this case, when the distance to the recognized white line is equal to or less than a threshold value, the vehicle tends to swerve within the lane even when the lane keeping assist control amount is not changed. Thus, in this case, the control amount change means avoids changing the lane keeping assist control amount. As a result, the lane keeping performance of the vehicle can be prevented from overly decreasing.

A feature of one embodiment of the present invention resides in that the vehicle control device further includes: lane departure alert means (10 and 60) for recognizing the road ahead of the vehicle, calculating a lane departure alert control amount (θLDA*) for carrying out driving support for the driver so that the vehicle does not depart from any one of both ends of the road, and carrying out steering control for the vehicle based on the lane departure alert control amount; and an operation device (18) to be used by the driver to select whether or not each of the lane keeping assist means and the lane departure alert means is to be operated, and the control amount change means is configured to stop an operation of the lane keeping assist means (S42) when the preliminary determination is made by the preliminary determination means under a state where the operations of the lane keeping assist means and the lane departure alert means have been selected by the operation device.

According to the one embodiment of the present invention, the lane departure alert means and the operation device are provided. The lane departure alert means recognizes the road ahead of the vehicle, calculates the lane departure alert control amount for carrying out the driving support for the driver so that the vehicle does not deviate from both the ends of the road (does not deviate outside of the white line), and carries out the steering control for the vehicle based on the lane departure alert control amount. The driver uses the operation device to select whether or not to operate each of the lane keeping assist means and the lane departure alert means.

The control amount change means stops the operation of the lane keeping assist means (decreases the lane keeping assist control amount to zero) when the preliminary determination is made by the preliminary determination means under a state where the operations of the lane keeping assist means and the lane departure alert means have been selected by the operation device. As a result, the vehicle can be caused to appropriately swerve within the lane so that the vehicle does not deviate outside of the lane.

A feature of one embodiment of the present invention resides in that the control amount change means is configured to operate the lane departure alert means and to stop the operation of the lane keeping assist means (S42) when the preliminary determination is made by the preliminary determination means under a state where the operation of the lane keeping assist means has been selected and the operation of the lane departure alert means has not been selected by the operation device.

According to the one embodiment of the present invention, the control amount change means operates the lane departure alert means and stops the operation of the lane keeping assist means (decreases the lane keeping assist control amount to zero) when the preliminary determination is made by the preliminary determination means under a state where the operation of the lane keeping assist means has been selected and the operation of the lane departure alert means has not been selected by the operation device. As a result, the vehicle can be caused to appropriately swerve within the lane so that the vehicle does not deviate outside of the lane.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DETAILED DESCRIPTION OF THE PREFERRED EMBODIMENT

Referring to the accompanying drawings, a vehicle control device according to embodiments of the present invention is described below.

Figure 1:
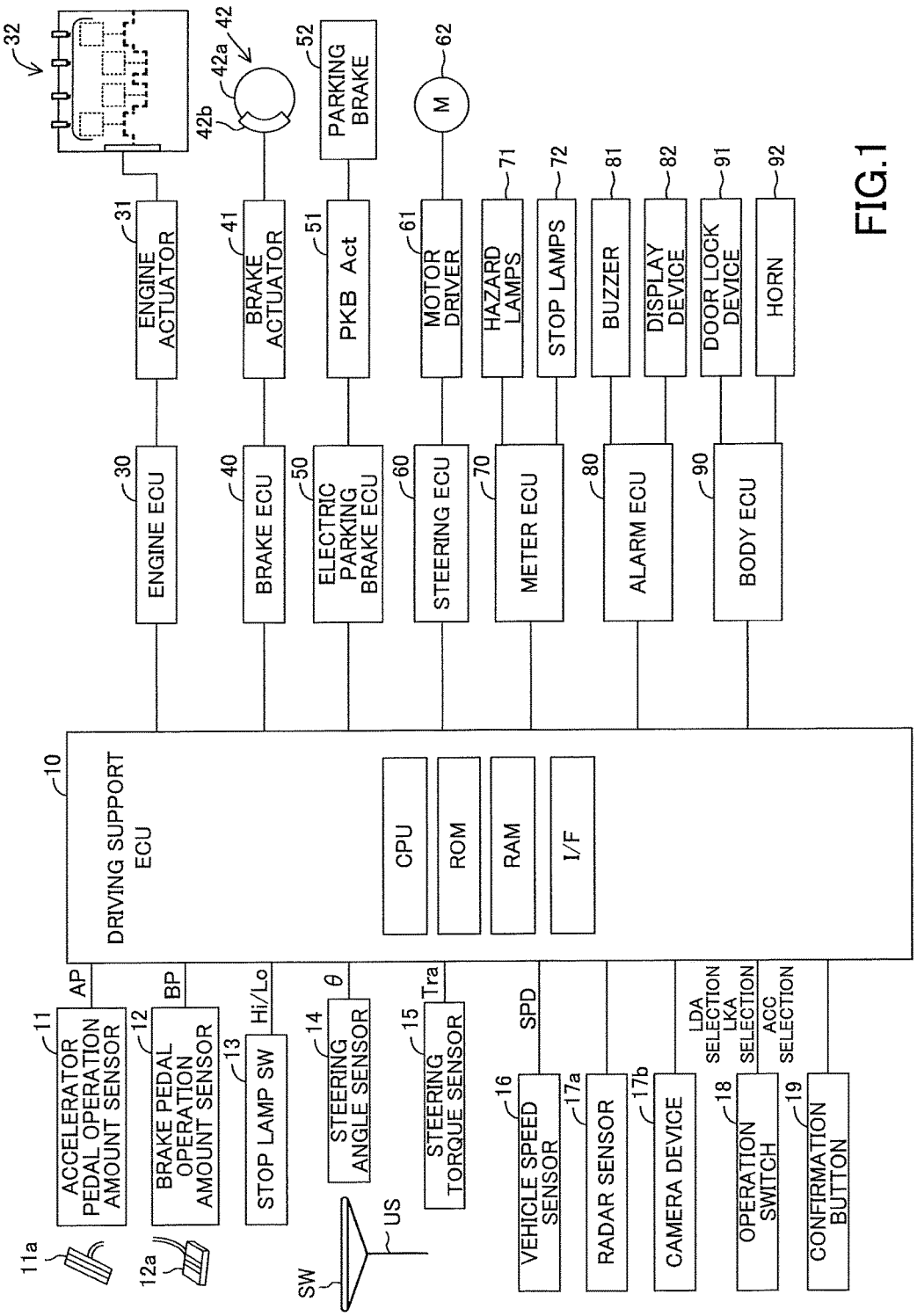
FIG. 1 is a schematic configuration diagram for illustrating a vehicle control device according to an embodiment of the present invention.

As illustrated in FIG. 1, the vehicle control device according to the embodiments of the present invention is applied to a vehicle (hereinafter also referred to as "own vehicle" in order to distinguish from other vehicles), and includes a driving support ECU 10, an engine ECU 30, a brake ECU 40, an electric parking brake ECU 50, a steering ECU 60, a meter ECU 70, an alarm ECU 80, and a body ECU 90.

Those ECUs are electric control units each including a microcomputer as a main part, and are connected to one another so as to be able to mutually transmit and receive information via a controller area network (CAN) (not shown). The microcomputer herein includes a CPU, a ROM, a RAM, a nonvolatile memory, an interface I/F, and the like. The CPU executes instructions (programs and routines) stored in the ROM to realize various functions. Some or all of those ECUs may be integrated into one ECU.

The driving support ECU 10 is connected to sensors (including switches) listed below, and is configured to receive detection signals or output signals from those sensors. Alternatively, each sensor may be connected to an ECU other than the driving support ECU 10. In this case, the driving support ECU 10 receives the detection signal or the output signal of the sensor from the ECU to which the sensor is connected via the CAN.

An accelerator pedal operation amount sensor 11 is configured to detect an operation amount (accelerator opening degree) AP of an accelerator pedal 11a of the own vehicle, and output a signal representing the accelerator pedal operation amount AP.

A brake pedal operation amount sensor 12 is configured to detect an operation amount BP of a brake pedal 12a of the own vehicle, and output a signal representing the brake pedal operation amount BP.

A stop lamp switch 13 is configured to output a low level signal when the brake pedal 12a is not stepped on (not operated), and output a high level signal when the brake pedal 12a is stepped on (operated).

A steering angle sensor 14 is configured to detect a steering angle θ of the own vehicle, and output a signal representing the steering angle θ.

The steering torque sensor 15 is configured to detect a steering torque Tra applied to a steering shaft US of the own vehicle by the steering of a steering wheel SW, and output a signal representing the steering torque Tra.

A vehicle speed sensor 16 is configured to detect a travel speed SPD (vehicle speed) of the own vehicle, and output a signal representing the vehicle speed SPD.

A radar sensor 17a is configured to acquire information on a road ahead of the own vehicle, and three-dimensional (3D) objects existing on the road. The 3D object means a moving object, for example, a pedestrian, a bicycle, or a motor vehicle, or a fixed object, for example, an electric pole, a tree, or a guard rail. Those 3D objects are hereinafter also referred to as "objects".

The radar sensor 17a includes a "radar transmission/reception part and a signal processing part" (neither shown).

The radar transmission/reception part is configured to radiate a radio wave in a millimeter wave band (hereinafter referred to as "millimeter wave") to a peripheral region of the own vehicle including a region ahead of the own vehicle, and receives a millimeter wave (namely, a reflected wave) reflected by an object existing in the radiation range.

The signal processing part is configured to acquire an inter-vehicle distance (longitudinal distance), a relative speed, a lateral distance, a relative lateral speed, and the like for each of the detected objects at predetermined time periods based on a phase difference between the transmitted millimeter wave and the received reflected wave, an attenuation level of the reflected wave, a period from the transmission of the millimeter wave to the reception of the reflected wave, and the like.

A camera device 17b includes a "stereo camera and an image processing part" (neither shown).

The stereo camera is configured to image scenes of both of a left side region and a right side region ahead of the own vehicle, thereby acquiring a pair of left and right pieces of image data.

The image processing part is configured to calculate and output presence/absence of objects, relative relationships between the own vehicle and objects, and the like based on the pair of left and right pieces of image data acquired by the stereo camera.

The driving support ECU 10 is configured to compose a relative relationship between the own vehicle and the object acquired by the radar sensor 17a and a relative relationship between the own vehicle and the object acquired by the camera device 17b with one another, thereby determining a relative relationship (object information) between the own vehicle and the object. Further, the driving support ECU 10 is configured to acquire lane markers (hereinafter simply referred to as "white lines"), for example, the left and right white lines of the road based on the pair of left and right pieces of image data (road image data) acquired by the camera 17b, thereby acquiring a shape of the road (curvature radius representing a degree of the curve of the road), a position relationship between the road and the own vehicle, and the like. In addition, the driving support ECU 10 can also acquire information on whether or not a road side wall exists based on the image data acquired by the camera device 17b.

An operation switch 18 is a switch operated by the driver. The driver operates the operation switch 18 to select whether or not to carry out lane keeping assist control (LKA). Moreover, the driver operates the operation switch 18 to select whether or not to carry out lane departure alert control (LDA). Further, the driver operates the operation switch 18 to select whether or not to carry out adaptive cruise control (ACC).

A confirmation button 19 is arranged at a position operable by the driver, and is configured to output a low level signal when the confirmation button 19 is not operated, and output a high level signal when the confirmation button 19 is pressed for operation.

The driving support ECU 10 is configured to be able to carry out the lane keeping assist control, the lane departure alert control, and the adaptive cruise control. Further, as described later, the driving support ECU 10 is configured to determine whether or not the driver is in an abnormal state where the driver has lost capability to drive the vehicle, and carry out various types of control for performing appropriate processing when the driver is determined to be in the abnormal state.

The engine ECU 30 is connected to an engine actuator 31. The engine actuator 31 is an actuator for changing an operation state of an internal combustion engine 32. In this example, the internal combustion engine 32 is a gasoline fuel injection, spark ignition, multi-cylinder engine, and includes a throttle valve for adjusting an intake air amount. The engine actuator 31 includes at least a throttle valve actuator for changing an opening degree of the throttle valve. The engine ECU 30 can drive the engine actuator 31, thereby changing a torque generated by the internal combustion engine 32. The torque generated by the internal combustion engine 32 is transmitted to drive wheels (not shown) via a transmission (not shown). Thus, the engine ECU 30 can control the engine actuator 31 to control a driving force of the own vehicle, thereby changing an acceleration state (acceleration).

The brake ECU 40 is connected to a brake actuator 41. The brake actuator 41 is provided in a hydraulic circuit between a master cylinder (not shown) configured to pressurize a working fluid with a stepping force on a brake pedal and friction brake mechanisms 42 provided on the front/rear left/right wheels. The friction brake mechanism 42 includes a brake disk 42a fixed to the wheel and a brake caliper 42b fixed to a vehicle body. The brake actuator 41 is configured to adjust a hydraulic pressure supplied to a wheel cylinder integrated into the brake caliper 42b in accordance with an instruction from the brake ECU 40 to use the hydraulic pressure to operate the wheel cylinder, thereby pressing a brake pad against the brake disk 42a and generating a friction braking force. Thus, the brake ECU 40 can control the brake actuator 41, thereby controlling the braking force of the own vehicle.

The electric parking brake ECU (hereinafter also referred to as "EPB ECU") 50 is connected to a parking brake actuator (hereinafter also referred to as "PKB actuator") 51. The PKB actuator 51 is an actuator for pressing the brake pad against the brake disk 42a, or is an actuator for pressing shoes against drums rotating together with the wheels when drum brakes are provided. Thus, the EPB ECU 50 can use the PKB actuator 51 to apply parking braking forces to the wheels, thereby maintaining the own vehicle in a stop state.

The steering ECU 60 is a control device for a known electric power steering system, and is connected to a motor driver 61. The motor driver 61 is connected to a steering motor 62. The steering motor 62 is integrated into a "steering mechanism including the steering wheel, a steering shaft coupled to the steering wheel, a steering gear mechanism, and the like" (not shown) of the vehicle. The steering wheel motor 62 can use electric power supplied by the motor driver 61 to generate a torque, use this torque to apply a steering assist torque, and steer left and right steered wheels.

The meter ECU 70 is connected to a digital display-type meter (not shown) and is also connected to hazard lamps 71 and stop lamps 72. The meter ECU 70 can flash the hazard lamps 71 and turn on the stop lamps 72 in accordance with an instruction from the driving support ECU 10.

The alarm ECU 80 is connected to a buzzer 81 and a display device 82. The alarm ECU 80 is configured to be able to sound the buzzer 81 in accordance with an instruction from the driving support ECU 10, thereby attracting attention of the driver. The alarm ECU 80 can also turn on a mark (e.g., a warning lamp) for attracting attention on the display device 82, display a warning message, and display an operation state of the driving support control.

The body ECU 90 is connected to a door lock device 91 and a horn 92. The body ECU 90 is configured to be able to unlock the door lock device 91 in accordance with an instruction from the driving support ECU 10.

Moreover, the body ECU 90 is configured to sound the horn 92 in accordance with an instruction from the driving support ECU 10.

<Control Processing Carried Out by Driving Support ECU 10>

A description is now given of control processing to be carried out by the driving support ECU 10. The driving support ECU 10 is configured to carry out an abnormal-time driving support control routine (FIG. 5) described later when both the lane keeping assist control (LKA) and the adaptive cruise control (ACC) are being carried out. Thus, a description is first given of the lane keeping assist control and the adaptive cruise control. Moreover, in a modified example described later, the driving support ECU 10 may be configured to start the lane departure alert control (LDA) during the execution of the abnormal-time driving support control routine, and hence a description is also given of the lane departure alert control.

<Lane Keeping Assist Control>

The lane keeping assist control (hereinafter referred to as "LKA") applies the steering torque to the steering mechanism so that the position of the own vehicle is maintained in a vicinity of the target travel line inside a "lane (travel lane) in which the own vehicle is traveling", thereby assisting the steering operation of the driver. The LKA itself is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210). Thus, a brief description is now given of the LKA.

Figure 2:
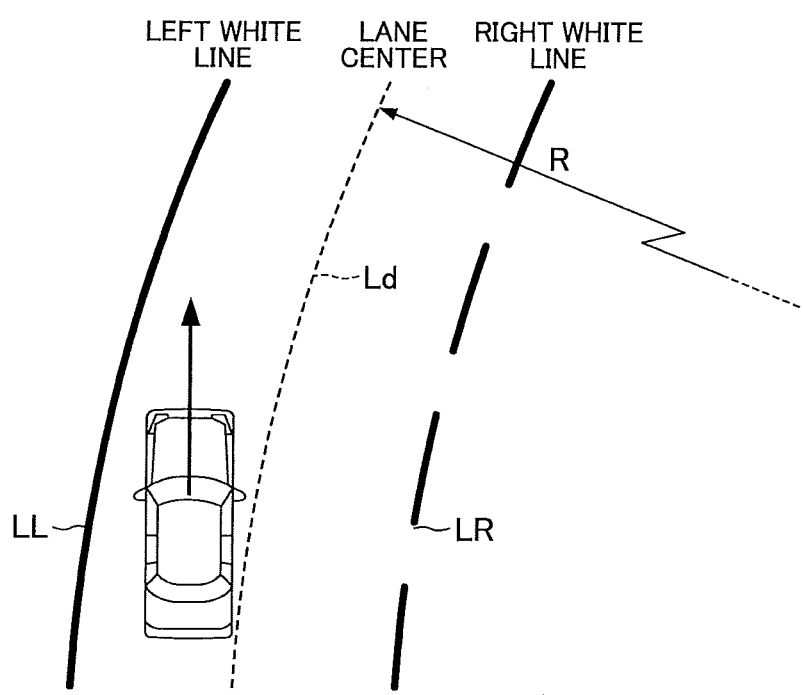
FIG. 2 is a plan view for illustrating a left white line, a right white line, a target travel line, and a curve radius.
Figure 3:
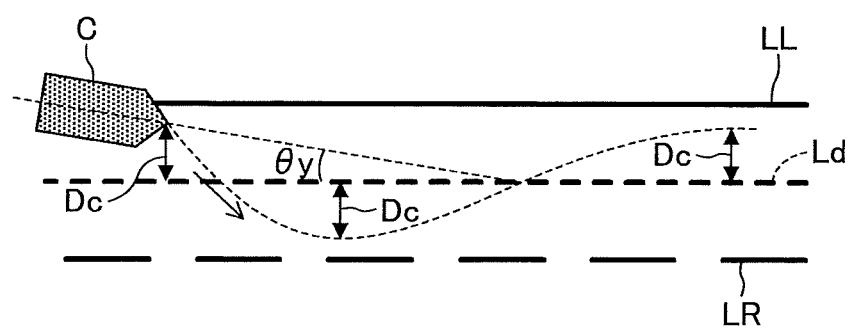
FIG. 3 is a diagram for illustrating lane keeping assist control.

The driving support ECU 10 is configured to carry out the LKA when the LKA is requested by the operation on the operation switch 18. More specifically, as illustrated in FIG. 2, when the LKA is requested, the driving support ECU 10 recognizes (acquires) the "left white line LL and the right white line LR" of the lane in which the own vehicle is traveling based on the image data transmitted from the camera device 17b, and determines a center position of those pair of white lines as a target travel line Ld. Further, the driving support ECU 10 is configured to calculate a curve radius (curvature radius) R of the target travel line Ld and a position and a direction of the own vehicle in the travel lane partitioned by the left white line LL and the right white line LR. Then, as illustrated in FIG. 3, the driving support ECU 10 calculates a distance Dc (hereinafter referred to as "center distance Dc") between a front end center position of the own vehicle C and the target travel line Ld in a road width direction, and a difference angle θy (hereinafter referred to as "yaw angle θy") between the direction of the target travel line Ld and the travel direction of the own vehicle C.

Further, the driving support ECU 10 calculates a target steering angle θLKA* at a predetermined calculation cycle based on the center distance Dc, the yaw angle θy, and the road curvature v (=1/curvature radius R) in accordance with Expression (1). In Expression (1), K1, K2, and K3 are control gains. The target steering angle θLKA* is a steering angle set so that the own vehicle can travel along the target travel line Ld.

$$\theta LKA^* = K1 \times v + K2 \times y + K3 \times Dc \qquad (1)$$

The driving support ECU 10 is configured to output a command signal representing the target steering angle θLKA* to the steering ECU 60. The steering ECU 60 is configured to apply drive control to the steering motor 62 so that the steering angle follows the target steering angle θLKA*. In this case, the driving support ECU 10 calculates a target torque for achieving the target steering angle θLKA* at a predetermined calculation cycle based on the target steering angle θLKA* and an actual steering angle. For example, the driving support ECU 10 stores a lookup table for prescribing a relationship between the target torque and the difference between the target steering angle θLKA* and the actual steering angle in advance, and calculates the target torque by referring to this table. The driving support ECU 10 then uses the steering ECU 60 to apply drive control to the steering motor 62 so as to generate the target torque on the steering motor 62. As the actual steering angle, the steering angle θ detected by the steering angle sensor 14, or a detection value of a sensor for directly detecting the steering angle of the steered wheel may be used.

A control amount used for the LKA is the target steering angle θLKA* in this example, but may be a target yaw rate or a target lateral acceleration of the own vehicle in place of the target steering angle θLKA*. In other words, the left side of Expression (1) may be the target yaw rate or the target lateral acceleration. In this case, for example, the driving support ECU 10 inputs a detection signal of a yaw rate sensor or a lateral acceleration sensor (not shown) and calculates a difference between the target yaw rate and an actual yaw rate (a detection value of the yaw rate sensor), or a difference between the target lateral acceleration and an actual lateral acceleration (a detection value of the lateral acceleration sensor). Then, the driving support ECU 10 refers to a lookup table for prescribing a relationship between such a difference and the target torque, thereby calculating the target torque.

The LKA assists the driving of the driver so that a travel position of the own vehicle moves along the target travel line Ld. Thus, even when the LKA is carried out, the hands-free driving is not permitted, and the driver needs to hold the steering wheel SW. The LKA has thus been summarized.

A function part of the driving support ECU 10 for carrying out the LKA corresponds to lane keeping assist means according to the present invention.

<Lane Departure Alert Control (LDA)>

The lane departure alert control (hereinafter referred to as "LDA") is control of applying the steering torque to the steering mechanism so that the position of the own vehicle does not deviate outside of the "lane (travel lane) in which the own vehicle is traveling", thereby assisting the steering operation of the driver. Moreover, when the LDA is about to be carried out, the driver is warned by the buzzer 81 or the display device 82. The LDA itself is widely known. Thus, a brief description is now given of the LDA.

Figure 4:
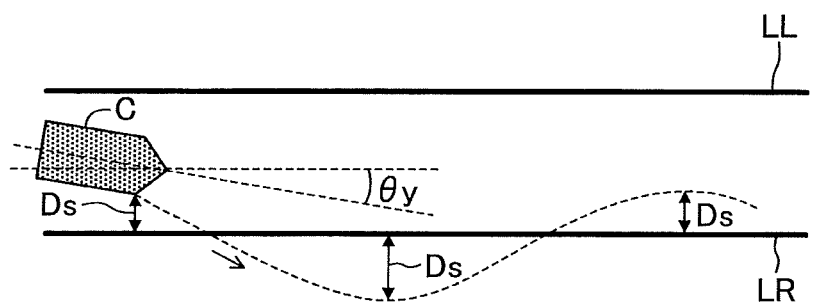
FIG. 4 is a diagram for illustrating lane departure alert control.

The driving support ECU 10 is configured to carry out the LDA when the LDA is requested by the operation on the operation switch 18. More specifically, as illustrated in FIG. 2, when the LDA is requested, the driving support ECU 10 recognizes (acquires) the "left white line LL and the right white line LR" of the lane in which the own vehicle is traveling based on the image data transmitted from the camera device 17b, and calculates the curve radius R of the center line Ld, which is the center position of those pair of white lines. Moreover, as illustrated in FIG. 4, the driving support ECU 10 calculates the difference angle θy (hereinafter referred to as "yaw angle θy") between the direction of the center line Ld and the direction toward which the own vehicle C is facing. Further, the driving support ECU 10 calculates respective distances Ds (referred to as "side distances Ds") in the road width direction between the front left wheel of the own vehicle C and the left white line LL and between the front right wheel and the right white line LR. In FIG. 4, only the side distance Ds between the front right wheel and the right white line LR is illustrated. In this case, two left and right side distances Ds exist, but the side distance Ds in a direction toward which the own vehicle is predicted to deviate from the lane, namely, a direction indicated by the yaw angle θy only needs to be used for the calculation of a control amount of the LDA.

The driving support ECU 10 is configured to calculate a target steering angle θLDA* at a predetermined calculation cycle in accordance with Expression (2). The target steering angle θLDA* is a steering angle set so that the own vehicle does not deviate outside of the white line.

$$\theta LDA^* = K4 \times v + K5 \times \theta y + K6 \times Ds' \quad (2)$$

On this occasion, K4, K5, and K6 are control gains, respectively. Moreover, v is the road curvature (=1/R). Moreover, Ds' is set in correspondence to the side distance Ds. That is, Ds' is set to decrease as the front wheel existing inside the white line subject to the departure alert (on a center side of the road) departs from the white line toward the inside (as Ds increases), and is set to increase as the front wheel existing outside the white line subject to the departure alert departs from the white line toward the outside.

The driving support ECU 10 is configured to output a command signal representing the target steering angle θLDA* to the steering ECU 60. The steering ECU 60 is configured to apply the drive control to the steering motor 62 so that the steering angle follows the target steering angle θLDA*. In this case, the driving support ECU 10 calculates, as in the case where the LKA Is carried out, the target steering torque at a predetermined calculation cycle based on the target steering angle θLDA* and the actual steering angle, and uses the steering ECU 60 to apply the drive control to the steering motor 62 so as to generate the target torque on the steering motor 62.

The control amount used for the LDA is the target steering angle θLDA* in this example, but may be a target yaw rate or a target lateral acceleration in place of the target steering angle θLDA*. In other words, the left side of Expression (2) may be the target yaw rate or the target lateral acceleration of the own vehicle. In this case, for example, the driving support ECU 10 inputs the detection signal of the yaw rate sensor or the lateral acceleration sensor (not shown) and calculates a difference between the target yaw rate and the actual yaw rate (the detection value of the yaw rate sensor), or a difference between the target lateral acceleration and the actual lateral acceleration. Then, the driving support ECU 10 refers to a lookup table for prescribing a relationship between such a difference and the target torque, thereby calculating the target torque to be generated on the steering motor 62. The LDA has thus been summarized.

A function part of the driving support ECU 10 for carrying out the LDA corresponds to lane departure alert means according to the present invention.

<Adaptive Cruise Control (ACC)>

The adaptive cruise control (hereinafter referred to as "ACC") is control of causing the own vehicle to follow a preceding vehicle traveling immediately ahead of the own vehicle while maintaining a distance between the own vehicle and the preceding vehicle to be a predetermined distance based on the object information. The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description is now given of the ACC.

The driving support ECU 10 is configured to carry out the ACC when the ACC is requested by the operation on the operation switch 18.

More specifically, the driving support ECU 10 is configured to select a following subject vehicle based on the object information acquired from the radar sensor 17a and the camera device 17b when the ACC is requested. For example, the driving support ECU 10 determines whether or not a relative position of the detected object (n) identified by a lateral distance Dfy(n) and an inter-vehicle distance Dfx(n) of the object (n) exists in a following subject vehicle area defined in advance so that the lateral distance decreases as the inter-vehicle distance increases. Then, the driving support ECU 10 selects the object (n) as the following subject vehicle when the relative position of the object exists in the following subject vehicle area for a period equal to or more than a predetermined period.

Further, the driving support ECU 10 calculates a target acceleration Gtgt in accordance with any one of Expression (3) and Expression (4). In Expression (3) and Expression (4), Vfx(a) is a relative speed of a following subject vehicle (a), k1 and k2 are predetermined positive gains (coefficients), and ΔD1 is an inter-vehicle distance difference (=Dfx(a)−Dtgt) acquired by subtracting the "target inter-vehicle distance Dtgt from an inter-vehicle distance Dfx(a) of the following subject vehicle (a)". The target inter-vehicle distance Dtgt is calculated by multiplying a target inter-vehicle period Ttgt set by the driver using the operation switch 18 by the vehicle speed SPD of the own vehicle (that is, Dtgt=Ttgt·SPD).

The driving support ECU 10 uses Expression (3) to determine the target acceleration Gtgt when the value (k1·ΔD1+k2·Vfx(a)) is positive or "0". ka1 is a positive gain (coefficient) for acceleration, and is set to a value equal to or less than "1".

The driving support ECU 10 uses Expression (4) to determine the target acceleration Gtgt when the value (k1·ΔD1+k2·Vfx(a)) is negative. kd1 is a gain (coefficient) for deceleration, and is set to "1" in this example.

$$Gtgt \text{ (for acceleration)} = ka1 \cdot (k1 \cdot \Delta D1 + k2 \cdot Vfx(a)) \quad (3)$$

$$Gtgt \text{ (for deceleration)} = kd1 \cdot (k1 \cdot \Delta D1 + k2 \cdot Vfx(a)) \quad (4)$$

When an object does not exist in the following subject vehicle area, the driving support ECU 10 determines the target acceleration Gtgt based on a "target speed set in accordance with the target inter-vehicle distance Ttgt" and the vehicle speed SPD of the own vehicle so that the vehicle speed SPD matches the target speed.

The driving support ECU 10 uses the engine ECU 30 to control the engine actuator 31, and, depending on necessity, uses the brake ECU 40 to control the brake actuator 41 so that the acceleration of the own vehicle matches the target acceleration Gtgt. The ACC has thus been summarized.

<Abnormal-Time Driving Support Control Routine>

Figure 5:
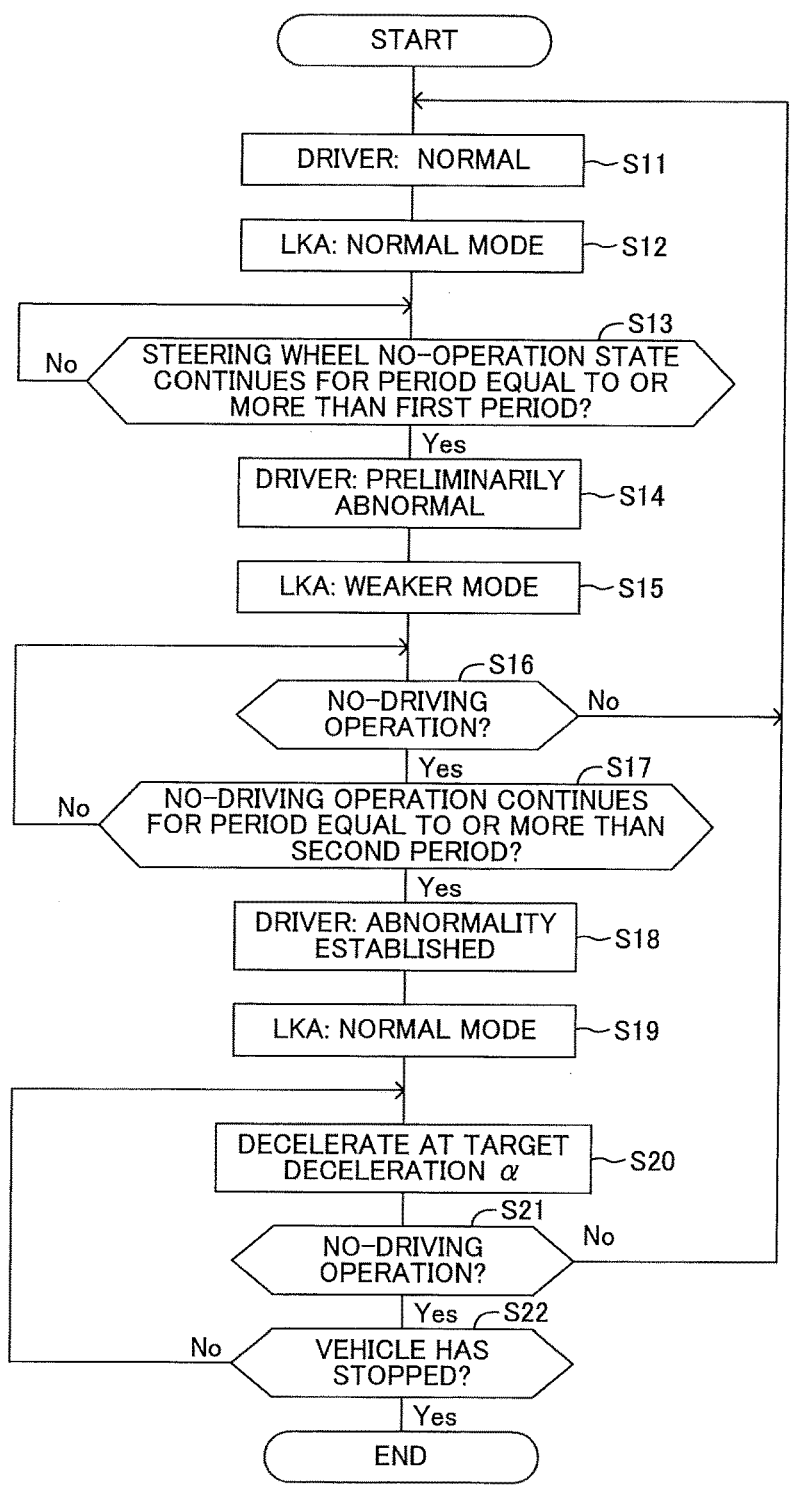
FIG. 5 is a flowchart for illustrating an abnormal-time driving support control routine according to a first embodiment of the present invention.

A description is now given of abnormal-time driving support control processing to be carried out by the driving support ECU 10. FIG. 5 is a flowchart for illustrating an abnormal-time driving support control routine to be executed by the driving support ECU 10. When the driving support ECU 10 is carrying out both the LKA and the ACC, the driving support ECU 10 executes the abnormal-time driving support control routine in parallel with both the LKA and the ACC.

When the abnormal-time driving support control routine starts, in Step S11, the driving support ECU 10 sets a state of the driver to "normal". In this abnormal-time driving support control routine, processing of the routine is determined in accordance with the state of the driver, but the state of the driver is not set when the routine starts. Thus, in Step S11, the state of the driver is set to be "normal", which also serves as an initial setting.

Then, in Step S12, the driving support ECU 10 sets a control mode of the LKA to a "normal mode". The control mode of the LKA is divided into the "normal mode" and a "weaker mode", and one of the modes is selected to be carried out. The "normal mode" Is a mode where the steering angle is controlled so that the own vehicle can appropriately travel along the target travel line, and the control amount is set in accordance with Expression (1). On the other hand, compared with the "normal mode", the "weaker mode" is a mode where the steering angle is controlled so that the own vehicle is unlikely to travel along the target travel line. The LKA is set to the "normal mode" as long as the "weaker mode" is not set. Those two control modes for the LKA are not set in accordance with preference of the driver, and are set by this abnormal-time driving support control routine.

The driving support ECU 10 is configured to carry out the LKA in parallel with the abnormal-time driving support control routine. Thus, in Step S12, the control mode of the LKA carried out in parallel with the abnormal-time driving support control routine is set to the "normal mode". Thus, the steering operation of the driver is supported so that the own vehicle travels along the target travel line.

Subsequently, in Step S13, the driving support ECU 10 determines whether or not a hands-free period in which the steering wheel SW is not operated has continued for a period equal to or more than a first period. In other words, the driving support ECU 10 measures a hands-free continuation period in which the steering wheel SW is not operated, and determines whether or not the hands-free continuation period is equal to or more than the first period. For example, the state where the steering wheel SW is not operated can be detected as the state where a steering torque Tra detected by the steering torque sensor is "0". Thus, in Step S13, it is determined whether or not the continuation period in which the steering torque Tra is "0" is equal to or more than the first period.

The measurement of the hands-free continuation period only needs to determine whether or not the steering torque Tra is "0" at a predetermined calculation cycle, increment a timer value each time Tra=0 is detected, and clear the timer value to zero each time Tra≠0 is detected. In this case, when the timer value reaches a value equal to or more than the first period, the determination in Step S13 becomes "Yes".

The driving support ECU 10 repeats the determination in Step S13 until the hands-free continuation period reaches the first period. When the hands-free continuation period reaches the first period after this processing has been repeated (Yes in Step S13), in Step S14, the driving support ECU 10 preliminarily determines that the driver is in the abnormal state. As described later, the determination of whether or not the driver is in the abnormal state is made in two stages including the determination in Step S14. A first determination is this determination in Step S14. This determination is referred to as "preliminary determination", and the state of the driver on this occasion is referred to as "preliminary abnormality".

When the driver is preliminarily determined to be in the abnormal state, the driver may have actually lost the capability to drive the vehicle, or the driver may have the capability to drive the vehicle but is neglecting the steering wheel operation (is carrying out the hands-free operation).

Thus, in Step S15, the driving support ECU 10 switches the control mode of the LKA from the "normal mode" to the "weaker mode" ("normal mode"→"weaker mode") in order to prompt the driver in the latter case neglecting the steering wheel operation to operate the steering wheel. When the driving support ECU 10 sets the control mode of the LKA to the "weaker mode", the driving support ECU 10 changes the control gain K2 and the control gain K3 in Expression (1) to values smaller than those used in the "normal mode". In other words, the control gain K2 of a yaw angle proportional term proportional to the magnitude of the yaw angle θy, and the control gain K3 of a center distance proportional term proportional to the magnitude of the center distance Dc are changed to smaller values compared with those used in the "normal mode".

For example, when the values in the "normal mode" of the control gain K2 and the control gain K3 are denoted by a normal control gain K2a and a normal control gain K3a, and the values in the "weaker mode" thereof are denoted by a weaker control gain K2b and a weaker control gain K3b, the weaker control gains K2b and K3b are represented, for example, as follows.

$$K2b = 0.1 \times K2a$$

$$K3b = 0.1 \times K3a$$

In this example, the weaker control gains K2b and K3b are set to values of 1/10 of the normal control gains K2a and K3a, respectively, but the degrees of weakness may be arbitrarily set.

Thus, when the control mode of the LKA is set to the "weaker mode", the own vehicle is unlikely to travel along the target travel line Ld compared with the "normal mode", and tends to swerve in a lateral direction (road widthwise direction). In this case, the control gain K1, which is a curvature proportional term proportional to the magnitude of the road curvature v (=1/curvature radius R) is not changed. This is because when the control gain K1 is decreased, the own vehicle may deviate outside of the left or right white line of the travel lane when the own vehicle travels on a curved road. Thus, the own vehicle can be caused to appropriately swerve within the travel lane without deviating outside of the travel lane by decreasing only the control gain K2 and the control gain K3.

When the travel state of the own vehicle changes in this way, the own vehicle does not travel on the travel line desired for the driver. Therefore, a driver who has not lost the driving capability is prompted to carry out the steering wheel operation. As a result, the driver, who has neglected the steering wheel operation, starts the steering wheel operation, and no longer puts too much confidence in the LKA. Moreover, for example, a dosing driver may be awakened by swerving the own vehicle.

Thus, a driver who has not lost the driving capability reacts in some way to the change in the travel state of the own vehicle, for example, by performing the steering wheel operation. For example, an intentional driving operation such as a brake pedal operation or an accelerator pedal operation of the driver may be started. Alternatively, an intentional change in posture of the driver and the like may occur. Thus, it is possible to discriminate the abnormal state where the driver has lost the capability to drive the vehicle and the state where the driver is neglecting the steering wheel operation even when the driver is capable of driving the vehicle from each other based on the presence/absence of the reaction of the driver.

The driving support ECU 10 sets the control mode of the LKA to the "weaker mode", and then, in Step S16, determines whether or not the driver is in a state of not carrying out operations for driving the vehicle (no-driving operation state). This no-driving operation state is a state where any parameter out of a combination of at least one of the "accelerator pedal operation amount AP, the brake pedal operation amount BP, the steering torque Tra, and a signal level of the stop lamp switch 13" that change due to an operation by the driver (input to a driving operator) does not change.

When the driver is in the no-driving operation state (Yes in Step S16), in Step S17, the driving support ECU 10 determines whether or not the no-driving operation state has continued for a second period, which is a threshold value set in advance. The continuation period of the no-driving operation state used in Step S17 may be a continuation period after the preliminary determination is made or a period including the hands-free continuation period measured in Step S13. In the latter case, the second period is set to be longer than the first period.

When the continuation period of the no-driving operation state is less than the second period (No in Step S17), the driving support ECU 10 returns the processing to Step S16. In this way, the driving support ECU 10 repeats the processing in Steps S16 and S17 at a predetermined calculation cycle. Under this state, the state of the driver determined by the driving support ECU 10 is maintained to be "preliminarily abnormal".

When the driving operation is detected before the continuation period of the no-driving operation state reaches the second period (No in Step S16), the driving support ECU 10 returns the processing to Step S11. Thus, the preliminary determination that the driver is in the abnormal state is cancelled, and the state of the driver is set to be "normal". Moreover, the control mode of the LKA is returned to the "normal mode" ("weaker mode"→"normal mode").

For example, when the driver, who has been neglecting the steering wheel operation and carrying out the hands-free driving, resumes the steering wheel operation as a result of the change in the travel state of the own vehicle, in Step S16, a determination "No" is made, and the preliminary determination that the driver is in the abnormal state is cancelled.

On the other hand, when the travel state of the own vehicle changes, but the continuation period of the no-driving operation state reaches the second period (Yes in Step S17), the driving support ECU 10 causes the processing to proceed to Step S18, and establishes the determination that the driver is in the abnormal state. As a result, the state of the driver determined by the driving support ECU 10 switches from "preliminarily abnormal" to "abnormal". Then, the driving support ECU 10 causes the processing to proceed to Step S19, and switches the control mode of the LKA to the "normal mode" ("weaker mode"→"normal mode"). As a result, the own vehicle can be caused to appropriately travel along the target travel line Ld.

Subsequently, in Step S20, the driving support ECU 10 stops the ACC, and decelerates the own vehicle at a constant target deceleration α set in advance. In this case, the driving support ECU 10 acquires an acceleration of the own vehicle from a change amount per unit period in the vehicle speed SPD acquired based on the signal from the vehicle speed sensor 16, and outputs a command signal for causing the acceleration to match the target acceleration a to the engine ECU 30 and the brake ECU 40. As a result, the own vehicle can be decelerated at the constant target deceleration α. Thus, the deceleration control can be carried out in parallel with the LKA.

Then, in Step S21, the driving support ECU 10 determines whether or not the driver is in the no-driving operation state where the driver does not carry out the operation for driving the vehicle. When the driver is in the no-driving operation state, in Step S22, the driving support ECU 10 determines whether or not the own vehicle has stopped based on the vehicle speed SPD. When the own vehicle has not stopped, the driving support ECU 10 returns the processing to Step S20, and continues the deceleration control, which is the control processing of decelerating the own vehicle at the target deceleration α.

When the driving operation is detected during the deceleration of the own vehicle (No in Step S21), the driving support ECU 10 returns the processing to Step S11. Thus, the determination that the driver is in the abnormal state is cancelled, and the state of the driver is set to be "normal". Moreover, the LKA is set to the "normal mode", and the deceleration control is stopped.

When the own vehicle stops as a result of the deceleration control while the driving operation is not detected (Yes in Step S22), the driving support ECU 10 finishes this routine.

With the above-mentioned vehicle control device according to this embodiment, when the hands-free state of the driver continues for the first period while the LKA is being carried out, the preliminary determination that the driver is in the abnormal state is made, and the control mode of the LKA is set to the "weaker mode". As a result, the own vehicle can be caused to swerve within the lane, and thus the driver is prompted to carry out the steering wheel operation. Thus, the driver, who has neglected the steering wheel operation, starts the steering wheel operation, and no longer puts too much confidence in the LKA. When the driving operation is started in this way, the preliminary determination that the driver is in the abnormal state is cancelled.

On the other hand, when the LKA is set to the "weaker mode", but the no-driving operation state continues for a period equal to or more than the second period, the determination that the driver is in the abnormal state is established. Thus, when the precision of the determination that the driver is in the abnormal state becomes high, the abnormality determination is established, and, as a result of this establishment of the abnormality determination, the abnormal-time driving control is started. One piece of the abnormal-time driving control is the deceleration control of decelerating the own vehicle at the constant target deceleration $\alpha$, and another piece thereof is the LKA carried out in the "normal mode". In this way, the own vehicle can safely be stopped.

Various Modification Examples

In this embodiment, in Step S16 and Step S21, it is determined whether or not the driver is in the no-driving operation state. However, the determinations only need to be abnormality determination processing of determining whether or not the driver has lost the driving capability on this occasion, and other abnormality determination methods may be employed.

For example, so-called "driver monitoring technology" disclosed in Japanese Patent Application Laid-open No. 2013-152700 and the like may be employed as another example of the abnormality determination method for the driver. More specifically, a camera for imaging the driver is installed on a member (e.g., a steering wheel or a pillar) in a vehicle cabin, and the driving support ECU 10 uses the acquired image of the camera to monitor the direction of the line of sight or the direction of the face of the driver. The driving support ECU 10 determines that the driver is in the abnormal state when the line of sight or the face of the driver is kept facing for a predetermined period or more toward a direction in which the line of sight or the face of the driver is not usually directed for a long period during the normal driving of the vehicle.

As another example of the abnormality determination method for the driver, the confirmation button 19 may be used. More specifically, the driving support ECU 10 uses a display and/or a sound to prompt the operation of the confirmation button 19 each time a set confirmation period T1 elapses, and determines that the driver is in the abnormal state when the state where the confirmation button 19 is not operated continues for a period equal to or more than a set no-response period T2, which is more than the set confirmation period T1. As the abnormality determination for the driver, an arbitrary method other than those methods may be employed.

In other embodiments (second to fourth embodiments) described later, the above-mentioned abnormality determination methods for the driver and the like may be employed in place of the determination of the no-driving operation.

Second Embodiment

Figure 6:
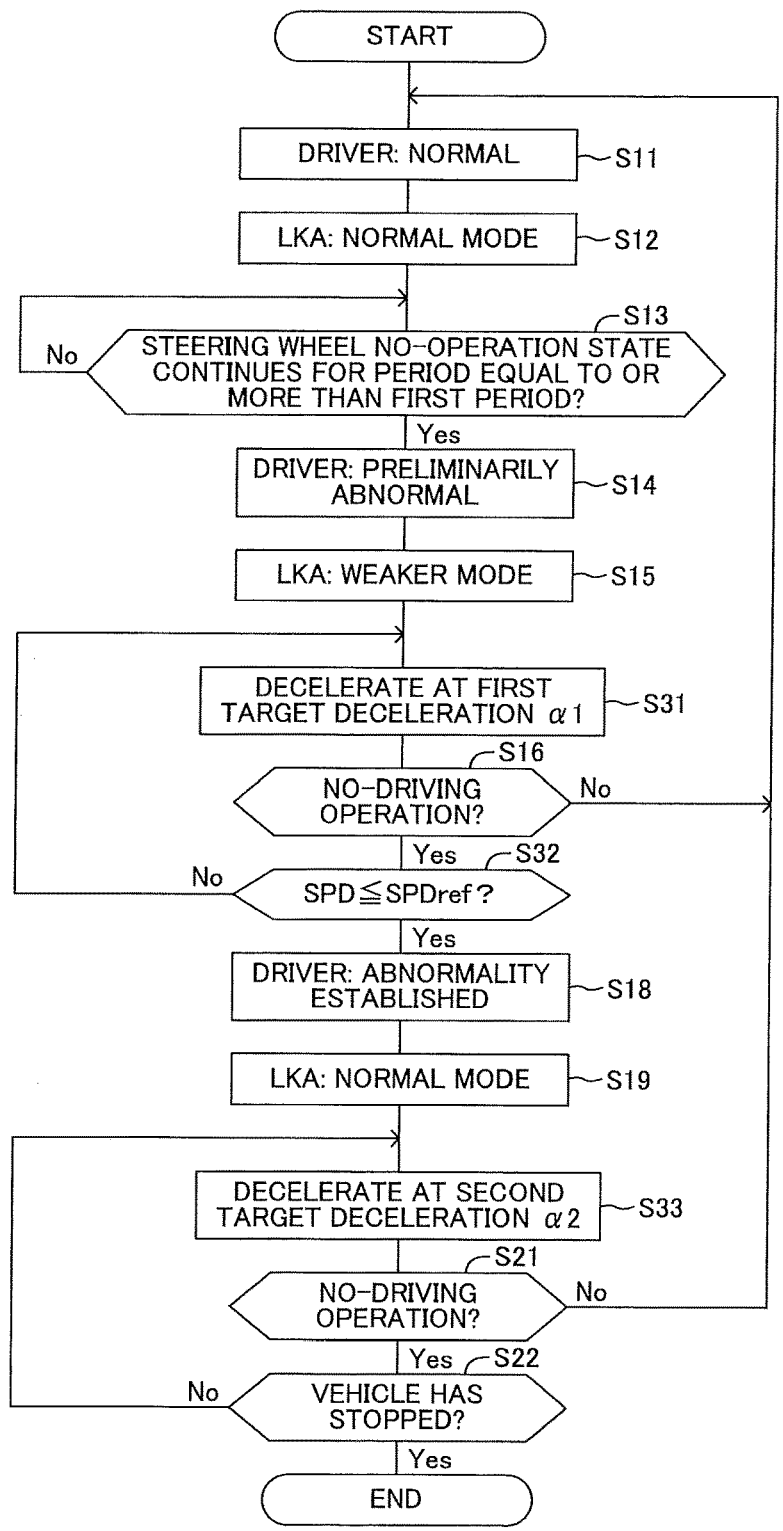
FIG. 6 is a flowchart for illustrating the abnormal-time driving support control routine according to a second embodiment of the present invention.

A description is now given of a vehicle control device according to a second embodiment of the present invention. The vehicle control device according to the second embodiment is different from the above-mentioned embodiment only in that the driving support ECU 10 is configured to carry out an abnormal-time driving support control routine illustrated in FIG. 6 in place of the abnormal-time driving support control routine described above (FIG. 5). In the following, the above-mentioned embodiment is referred to as a first embodiment of the present invention.

The second embodiment is different from the first embodiment in that the own vehicle is started to decelerate when the driver is preliminarily determined to be in the abnormal state. A description is now given of the abnormal-time driving support control routine (FIG. 6) according to the second embodiment. The same processing as that of the first embodiment is denoted by the same step number in FIG. 6, and a description thereof is omitted or briefly given. The condition under which the abnormal-time driving support control routine is executed in the second embodiment is the same as that in the first embodiment.

When the hands-free period continues for a period equal to or more than the first period (Yes in Step S13), the driving support ECU 10 preliminarily determines that the driver is in the abnormal state (Step S14), and switches the control mode of the LKA to the "weaker mode" (Step S15). Subsequently, in Step S31, the driving support ECU 10 stops the ACC, and decelerates the own vehicle at a constant first target deceleration $\alpha 1$ set in advance. In this case, the driving support ECU 10 outputs, to the engine ECU 30 and the brake ECU 40, a command signal for causing the acceleration of the own vehicle to match the first target deceleration $\alpha 1$. As a result, the own vehicle can be decelerated at the constant first target deceleration $\alpha 1$. This first target deceleration $\alpha 1$ is preferably a very gentle deceleration (deceleration having a small absolute value).

Then, in Step S16, the driving support ECU 10 determines whether or not the driver is in the no-driving operation state, and, when the driver is in the no-driving operation state, in Step S32, determines whether or not the vehicle speed SPD of the own vehicle is equal to or less than a vehicle speed threshold value SPDref set in advance.

When the vehicle speed SPD is more than the vehicle speed threshold value SPDref (No in Step S32), the driving support ECU 10 returns the processing to Step S31. In this way, the driving support ECU 10 repeats the processing in Steps S31, S16, and S32 at a predetermined calculation cycle. Thus, as long as the driving operation is not detected, the deceleration control continues at the first target deceleration $\alpha 1$ until the vehicle speed SPD decreases to the vehicle speed threshold value SPDref.

When the driving operation is detected before the vehicle speed SPD reaches the vehicle speed threshold value SPDref (No in Step S16), the driving support ECU 10 returns the processing to Step S11. As a result, the preliminary determination that the driver is in the abnormal state is cancelled, and the state of the driver is set to be "normal". For example, a dosing driver may be awakened by the deceleration of the own vehicle or the swerving of the own vehicle. In this case, the driving operation is resumed, and the "preliminary abnormal" state of the driver is cancelled.

When the vehicle speed SPD decreases to the vehicle speed threshold value SPDref without the detection of the driving operation (Yes in Step S32), in Step S18, the driving support ECU 10 establishes the determination that the driver is in the abnormal state (Step S18), and returns the control mode of the LKA to the "normal mode" (Step S19). Then, in Step S33, the driving support ECU 10 switches the target deceleration from the first target deceleration $\alpha 1$ to a second target deceleration α2 (α1→α2), thereby decelerating the own vehicle. This second target deceleration α2 is set to a value having a larger absolute value than the first target deceleration α1.

The driving support ECU 10 repeats the determinations in Steps S21 and S22 while decelerating the own vehicle at the second target deceleration α2, and cancels the abnormality determination for the driver when the driving operation is detected (No in Step S21) before the own vehicle stops. On the other hand, when the own vehicle stops without the detection of the driving operation, this routine is finished.

With the vehicle control device according to the second embodiment described above, when the hands-free state of the driver continues for the first period, the preliminary determination that the driver is in the abnormal state is made, the control mode of the LKA is set to the "weaker mode", and the deceleration control of the own vehicle is started at the first target deceleration. As a result, as in the first embodiment, the own vehicle can be caused to swerve within the lane. Thus, under the state where the driver has not actually fallen into the abnormal state, the driver can be prompted to carry out the steering wheel operation. Further, it is possible to cause the driver to notice the deceleration of the own vehicle, thereby leading the driver to react, for example, by performing the accelerator operation and the like. When the driver reacts, the determination that the driver is in the abnormal state can be cancelled.

Moreover, the deceleration of the own vehicle starts at the timing when the driver is preliminarily determined to be in the abnormal state, and the deceleration of the own vehicle can thus be started at the early timing, resulting in an increase in safety.

According to the second embodiment, in Step S32, the determination that the driver is in the abnormal state is established when the vehicle speed SPD decreases to the vehicle speed threshold value SPDref, but, in place of this configuration, as in Step S17 according to the first embodiment, the continuation period of the no-driving operation state may be used to establish the determination that the driver is in the abnormal state.

Preferably, the determination that the driver is in the abnormal state is established at a timing described below.

Modification Example of Abnormality Establishment Timing

Figure 7:
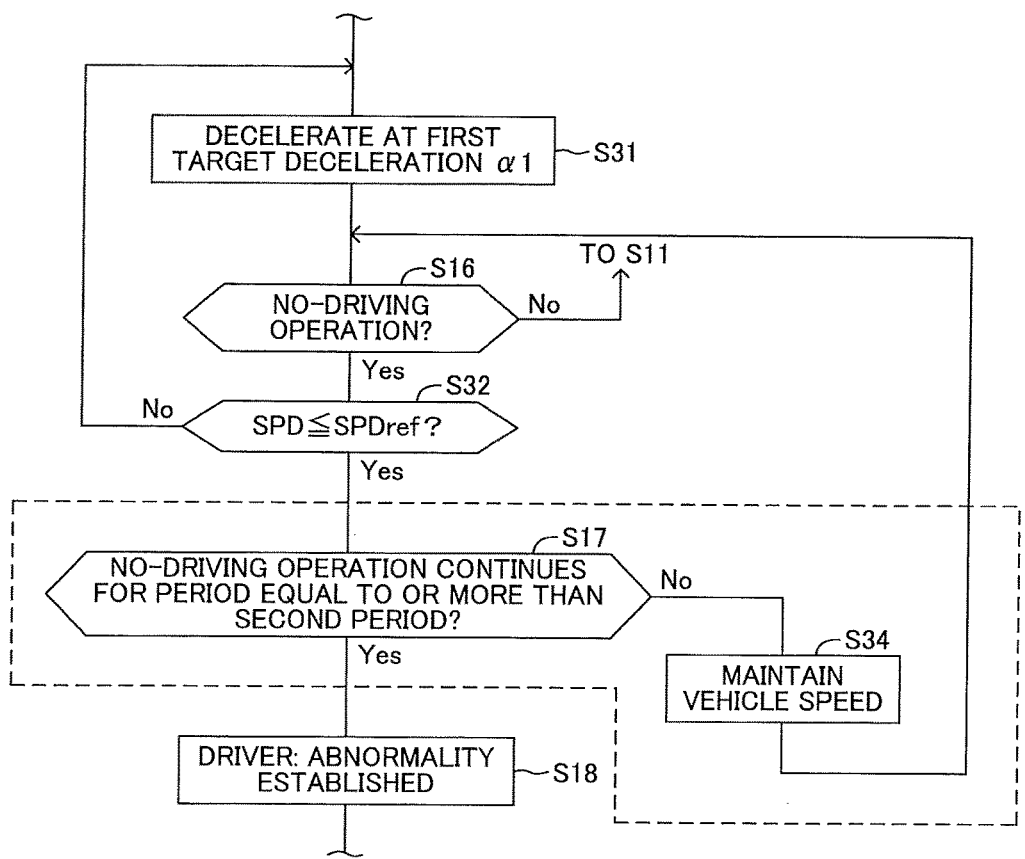
FIG. 7 is a part of a flowchart for illustrating a modified example of abnormality establishment according to the second embodiment.

FIG. 7 is a part of a flowchart for illustrating a portion changed from the processing of the abnormality-time driving support control routine (FIG. 6) according to the second embodiment. In this modification example, processing enclosed by the broken line in the flowchart is added. This modification example is hereinafter referred to as an abnormality establishment modification example.

When the driving operation of the driver is not detected, the driving support ECU 10 decelerates the own vehicle until the vehicle speed SPD decreases to the vehicle speed threshold value SPDref at the first target deceleration (Steps S31, S16, and S32). Then, when the vehicle speed SPD reaches a speed equal to or less than the vehicle speed threshold value SPDref (Yes in Step S32), in Step S17, the driving support ECU 10 determines whether or not the no-driving operation state has continued for a period equal to or more than the second period, which is the threshold value set in advance.

When the continuation period of the no-driving operation state is less than the second period (No in Step S17), the driving support ECU 10 causes the processing to proceed to Step S34, and outputs, to the engine ECU 30 and the brake ECU 40, a command signal for causing the own vehicle to travel at a constant speed of the current vehicle speed SPD acquired based on the signal from the vehicle speed sensor 16. As a result, the travel state of the own vehicle switches from the deceleration travel to a constant speed travel. When the constant speed travel continues, the driving support ECU 10 only needs to store a vehicle speed when the deceleration travel switches to the constant speed travel, and to maintain this vehicle speed.

The driving support ECU 10 outputs the command signal for causing the own vehicle to travel at the constant speed, and then returns the processing to Step S16. When the continuation period of the no-driving operation state reaches the second period after this processing has been repeated (Yes in Step S17), in Step S18, the driving support ECU 10 establishes the determination that the driver is in the abnormal state.

According to the abnormality establishment timing modification example, it is possible to reliably secure the period until the determination that the driver is in the abnormal state is established. In other words, when the vehicle speed at which the deceleration control starts at the first target deceleration α1 is low, the vehicle speed SPD decreases to the vehicle speed threshold value SPDref at an early timing with respect to the start of the deceleration control, but, according to this modification example, even in such a case, the driving support ECU 10 causes the own vehicle to travel at the constant speed until the continuation period of the no-driving operation state reaches the second period, thereby determining the presence/absence of the no-driving operation state. Therefore, after the abnormal state of the driver is determined at a high precision, the abnormal-time driving control can be started.

Third Embodiment

A description is now given of a vehicle control device according to a third embodiment of the present invention. The vehicle control device according to the third embodiment is different from the above-mentioned first and second embodiments only in that the driving support ECU 10 is configured to carry out an abnormal-time driving support control routine illustrated in FIG. 8 or FIG. 9 in place of the abnormal-time driving support control routine of the first embodiment or the second embodiment.

While the first embodiment and the second embodiment are configured to set the control mode of the LKA to the "weaker mode" when the hands-free state of the driver continues for the first period, this third embodiment is configured to interrupt the LKA, and carry out the LDA instead. When the LKA and the LDA are selected by the operation switch 18 to be carried out, the driving support ECU 10 executes an abnormality-time driving support control routine illustrated in FIG. 8. When the LKA is selected to be carried out and the LDA is not selected by the operation switch 18 to be carried out, the driving support ECU 10 executes an abnormality-time driving support control routine illustrated in FIG. 9.

Figure 8:
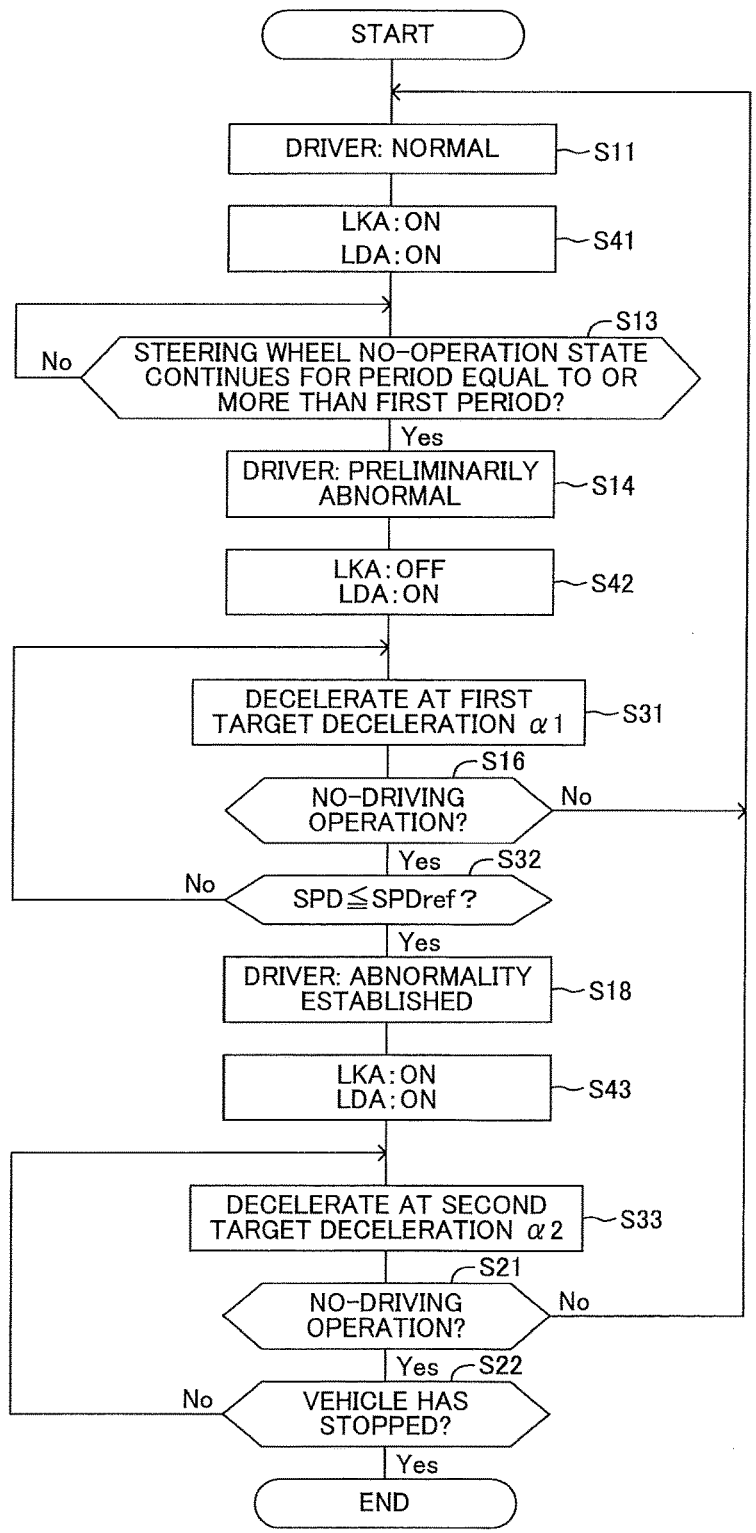
FIG. 8 is a flowchart for illustrating the abnormal-time driving support control routine according to a third embodiment of the present invention.
Figure 9:
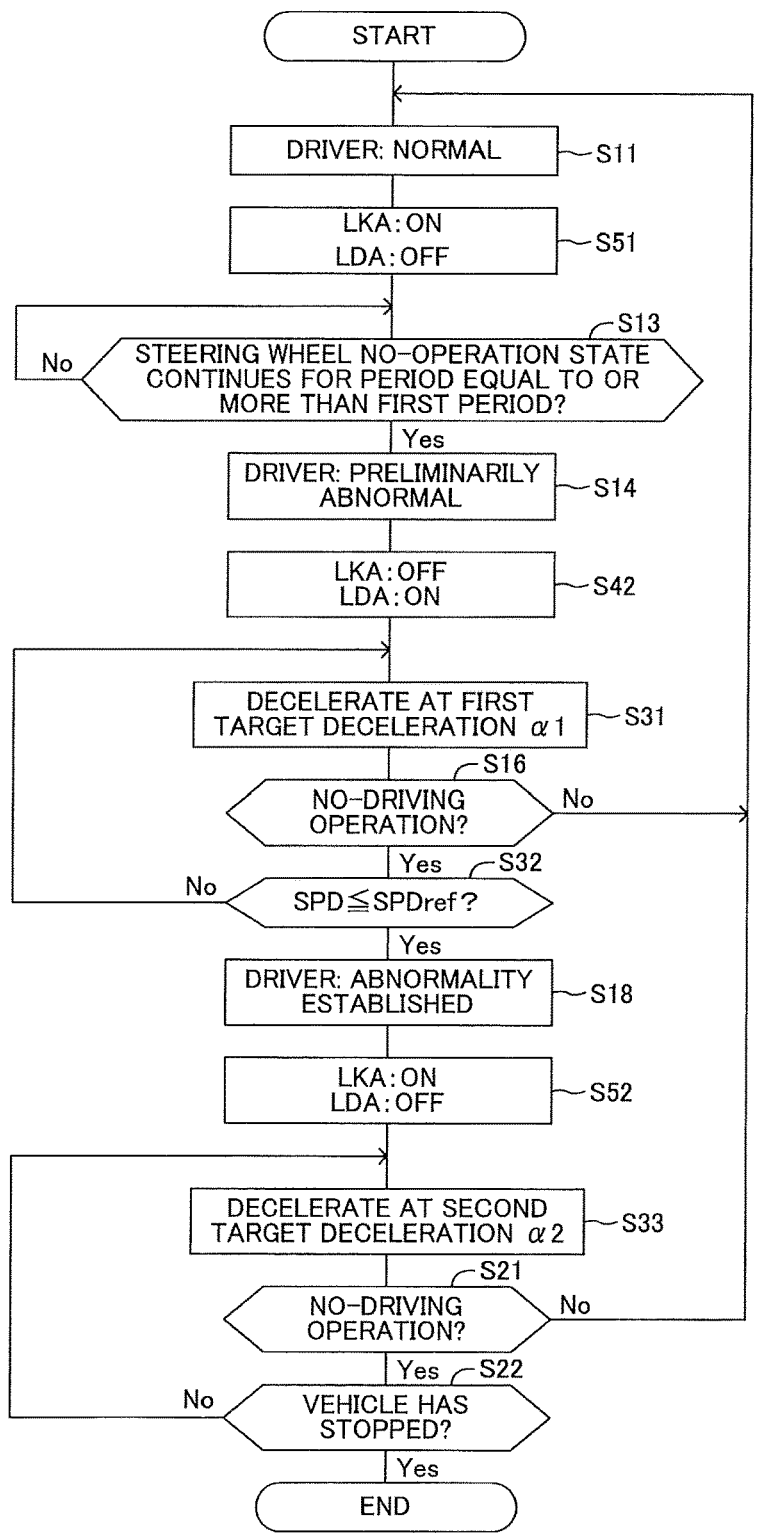
FIG. 9 is a flowchart for illustrating the abnormal-time driving support control routine according to the third embodiment.

The abnormality-time driving support control routine Illustrated in FIG. 8 is configured so as to incorporate Steps S41, S42, and S43 in place of the Steps S12, S15, and S19 of the abnormal-time driving support control routine (FIG. 6) according to the second embodiment. Moreover, the abnormal-time driving support control routine illustrated in FIG. 9 is configured so as to incorporate Steps S51, S42, and S52 in place of the Steps S12, S15, and S19 of the abnormal-time driving support control routine (FIG. 6) according to the second embodiment. The other processing is the same as that of the second embodiment, and thus the same step numbers are assigned in FIG. 9, and a description thereof is omitted or briefly given. This change in the processing can also be applied to the first embodiment.

When the ACC, the LKA, and the LDA are selected by the operation switch 18 to be carried out, the driving support ECU 10 starts the abnormal-time driving support control routine illustrated in FIG. 8. In Step S41, the driving support ECU 10 sets the LKA and the LDA to be on, in other words, brings the LKA and the LDA into an activation permission state, as set by the operation switch 18. When the LKA and the LDA are set to be on, the driving support ECU 10 switches between the LKA and LDA to carry out either in accordance with the position of the own vehicle with respect to the travel lane. That is, the driving support ECU 10 carries out the LKA while the own vehicle is not close to the left and right white lines, and carries out the LDA only when the own vehicle approaches the left or right white line for some reason and may deviate outside of the lane.

Immediately after this routine starts, the LKA and the LDA are set to be on, and thus, in Step S41, processing of changing this setting is not carried out. Thus, the steering control is applied to the own vehicle so as to basically travel along the target travel line by the LKA.

When the hands-free period continues for a period equal to or more than the first period (Yes in Step S13), the driving support ECU 10 preliminarily determines that the driver is in the abnormal state (Step S14), and causes the processing to proceed to Step S42. In Step S42, the driving support ECU 10 sets the LKA to be off (in other words, decreases the control amount of the LKA to zero). The LDA is maintained in the on setting. As a result, the own vehicle, which has been traveling along the target travel line, comes to deviate from the target travel line. In this case, the LDA functions, and the steering control is applied to the own vehicle so as not to deviate outside (outside of the white line) of the lane. Therefore, the own vehicle travels while swerving between the left and right white lines.

Therefore, the driver, who has not lost the driving capability, is prompted to carry out the steering wheel operation. As a result, the driver, who has neglected the steering wheel operation, starts the steering wheel operation, and no longer puts too much confidence in the LKA. Moreover, for example, a dosing driver may be awakened by swerving the own vehicle.

Subsequently, in Step S31, the driving support ECU 10 stops the ACC, and decelerates the own vehicle at the constant first target deceleration $\alpha 1$ set in advance, and, in Step S16, determines whether or not the driver is in the no-driving operation state. When the driver is in the no-driving operation state, in Step S32, the driving support ECU 10 determines whether or not the vehicle speed SPD is equal to or less than the vehicle speed threshold value SPDref set in advance.

When the vehicle speed SPD is more than the vehicle speed threshold value SPDref (No in Step S32), the driving support ECU 10 returns the processing to Step S31. In this way, the driving support ECU 10 repeats the processing in Steps S31, S16, and S32 at a predetermined calculation cycle.

When the driver resumes the driving operation in response to the change (swerving and deceleration) in the travel state, the determination in Step S16 is "No", and the processing is returned to Step S11. Thus, the preliminary determination that the driver is in the abnormal state is cancelled, and the state of the driver is set to be "normal". Moreover, in Step S41, the LKA is returned to the on setting. As a result, the own vehicle can be caused to appropriately travel along the target travel line Ld.

On the other hand, when the vehicle speed SPD decreases to the vehicle speed threshold value SPDref without the detection of the driving operation (Yes in Step S32), in Step S18, the driving support ECU 10 establishes the determination that the driver is in the abnormal state (Step S18), and, in Step S43, returns the LKA to the on setting. Then, the driving support ECU 10 carries out processing starting from Step S33. Thus, the own vehicle can be decelerated at the second target deceleration $\alpha 2$ to stop while the own vehicle is caused to appropriately travel along the target travel line Ld.

A description is now given of a case where, by the operation switch 18, the LKA is selected to be carried out, and the LDA is not selected to be carried out.

When, by the operation switch 18, the ACC and the LKA are selected to be carried out, and the LDA is selected not to be carried out, the driving support ECU 10 starts the abnormal-time driving support control routine illustrated in FIG. 9. In Step S51, the driving support ECU 10 sets the LKA to be on, and sets the LDA to be off as set by the operation switch 18. In this case, the driving support ECU 10 carries out only the LKA. As a result, the steering control is applied to the own vehicle so as to travel along the target travel line Ld.

When the hands-free period continues for a period equal to or more than the first period (Yes in Step S13), the driving support ECU 10 preliminarily determines that the driver is in the abnormal state (Step S14), and causes the processing to proceed to Step S42. In Step S42, the driving support ECU 10 sets the LKA to be off, and sets the LDA to be on. As a result, the LKA is stopped and the LDA begins. Thus, the vehicle traveling along the target travel line deviates from the target travel line. In this case, the LDA functions, and the steering control is applied to the own vehicle so as not to deviate outside (outside of the white line) of the lane. Therefore, the own vehicle travels while swerving between the left and right white lines.

Therefore, the driver, who has not lost the driving capability, is prompted to carry out the steering wheel operation. As a result, the driver, who has neglected the steering wheel operation, starts the steering wheel operation, and no longer puts too much confidence in the LKA. Moreover, for example, a dosing driver may be awakened by swerving the own vehicle.

Then, the driving support ECU 10 repeats the above-mentioned processing in Steps S31, S16, and S32. When the driver resumes the driving operation in response to the change (swerving and deceleration) in the travel state, the determination in Step S16 is "No", and the processing is returned to Step S11. Thus, the preliminary determination that the driver is in the abnormal state is cancelled, and the state of the driver is set to be "normal". Moreover, in Step S51, the LKA is returned to the on setting and the LDA is returned to the off setting, as set by the operation switch 18. As a result, the own vehicle can be caused to appropriately travel along the target travel line Ld.

On the other hand, when the vehicle speed SPD decreases to the vehicle speed threshold value SPDref without the detection of the driving operation (Yes in Step S32), in Step S18, the driving support ECU 10 establishes the determination that the driver is in the abnormal state (Step S18), and, in Step S52, returns the LKA to the on setting and returns the LDA to the off setting. Then, the driving support ECU 10 carries out the above-mentioned processing starting from Step S33. Thus, the own vehicle can be decelerated at the second target deceleration α2 to stop while the own vehicle is caused to appropriately travel along the target travel line Ld.

With the above-mentioned vehicle control device according to the third embodiment, when the hands-free state of the driver continues for the first period, the driver is preliminarily determined to be in the abnormal state, and the LKA is set to be off. In other words, the control amount of the LKA is decreased to zero. In this case, when the LDA has been set to off until the current time, the LDA is switched to the on setting. As a result, the steering of the own vehicle is controlled only by the LDA, and the own vehicle can thus be caused to swerve within the lane. As a result, as in the first and second embodiments, the driver can be prevented from carrying out the hands-free driving. Moreover, when the abnormality determination precision for the driver becomes high, the abnormal-time driving control can be carried out. As a result, the own vehicle can be safely stopped.

White Line Recognition Defect Handling Modification Example

The driving support ECU 10 is configured to recognize the left and right white lines of the lane in which the own vehicle is traveling based on the image data transmitted from the camera device 17b, and carry out the LKA and the LDA based on those white lines. Therefore, when the recognition state of the white lines is bad and the control amount of the LKA is decreased while the determination "preliminarily abnormal" is made as described above, the own vehicle may deviate from the lane. Moreover, when the recognition state of the while line is bad, the own vehicle naturally tends to swerve within the lane. Thus, the driving support ECU 10 calculates a recognition level of the white lines, and stops the decrease in the control amount of the LKA when the recognition level is equal to or less than the threshold value.

Figure 10:
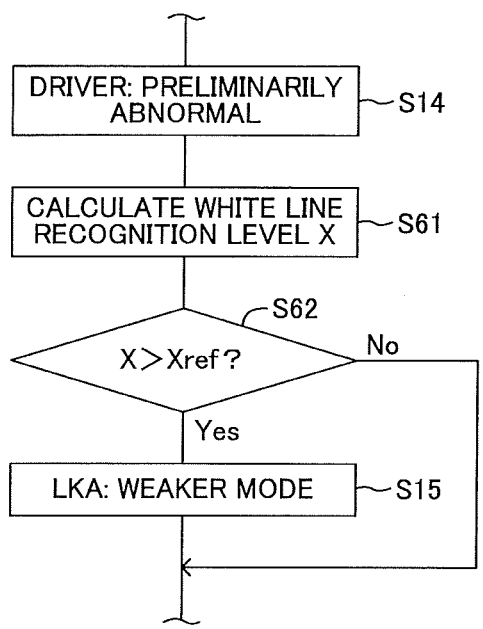
FIG. 10 is a part of a flowchart for illustrating a modified example of white line recognition defect handling to be applied in the first and second embodiments.
Figure 11:
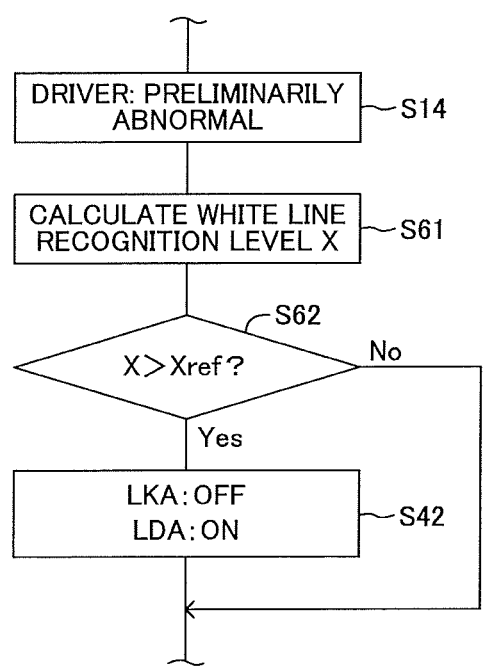
FIG. 11 is a part of a flowchart for illustrating a modified example of the white line recognition defect handling to be applied in the third embodiment.

For example, as illustrated in FIG. 10, the driving support ECU 10 carries out processing in Steps S61 and S62 as preprocessing for Step $15 in the abnormal-time driving support control routine (FIG. 5 or 6) according to the first embodiment or the second embodiment. In this case, in Step S61, the driving support ECU 10 calculates the recognition level X of the white lines, and, in Step S62, determines whether or not the recognition level X is more than a threshold value Xref. As the recognition level X, for example, distances to recognized white lines (LL and LR) may be used. When the recognition level X is more than the threshold value Xref set in advance (Yes in Step S62), the driving support ECU 10 causes the processing to proceed to Step S15, and sets the LKA to the "weaker mode". On the other hand, when the recognition level X is equal to or less than the threshold value Xref (No in Step S62), the driving support ECU 10 skips the processing in Step S15. As a result, the own vehicle can be suppressed from deviating from the lane. Similarly, as illustrated in FIG. 11, the driving support ECU 10 only needs to carry out the processing in Steps S61 and S62 as preprocessing for Step S42 in the abnormal-time driving support control routines (FIGS. 8 and 9) according to the third embodiment.

Fourth Embodiment

Figure 12:
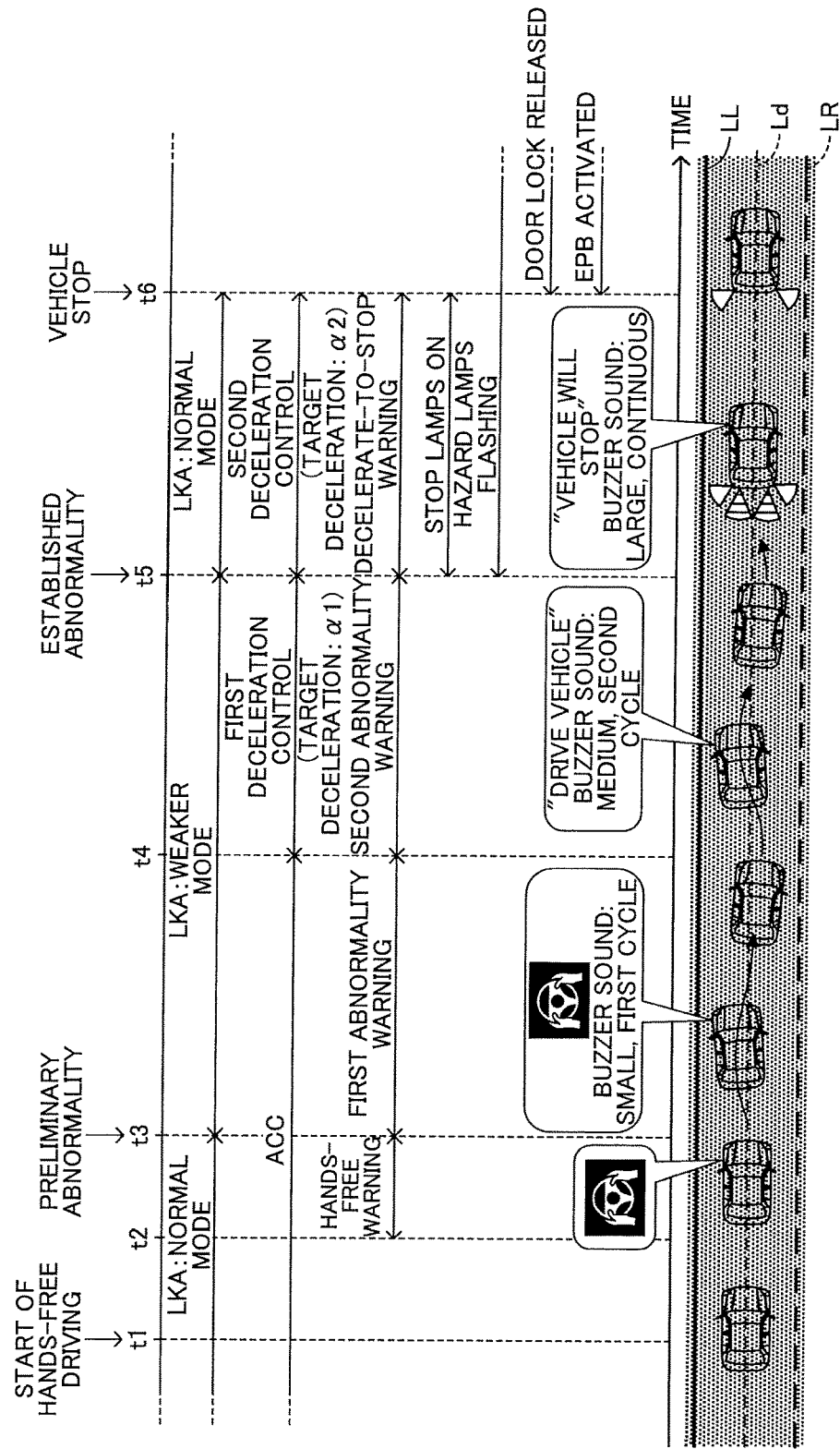
FIG. 12 is a timing chart for illustrating abnormal-time driving support control processing according to a fourth embodiment of the present invention.

A description is now given of a vehicle control device according to a fourth embodiment of the present invention. In the fourth embodiment, the driving support ECU 10 carries out processing, for example, warning the driver, attracting attention from surroundings, and the like in addition to the switching of the control mode of the LKA, the switching of the deceleration control, and the like. In the fourth embodiment, referring to a timing chart illustrated in FIG. 12, a description is given of the abnormal-time driving support control processing to be carried out by the driving support ECU 10. A description of specific methods, and actions and effects of the same processing as that of the first to third embodiments is omitted or briefly given.

Under a state where the driving support ECU 10 is carrying out the LKA and the ACC, when the driving support ECU 10 detects the state (hands-free state) where the steering wheel SW is not operated, the driving support ECU 10 measures the hands-free continuation period starting from a time point t1 of the detection. Then, the driving support ECU 10 starts a hands-free warning from a time point t2 at which the hands-free state has continued for a predetermined period (e.g., five seconds). In this case, the driving support ECU 10 outputs a hands-free warning command to the warning ECU 80. As a result, the warning ECU 80 displays a mark prompting holding of the steering wheel SW on the display device 82.

When such hands-free warning is provided, but the hands-free state continues for a predetermined period (e.g., 2 seconds), the driving support ECU 10 makes the preliminary determination that the driver is in the abnormal state at a time point t3 at which the predetermined period has elapsed. Based on this preliminary determination, the driving support ECU 10 switches the control mode of the LKA from the "normal mode" to the "weaker mode". An elapsed period (e.g., 7 seconds (5 seconds+2 seconds)) from the time point t1 to the time point t3 corresponds to the first period according to the first to third embodiments. The lowest column of FIG. 12 indicates a change in the travel position of the own vehicle in the travel lane. In this case, the own vehicle starts swerving in the lane from the time point t3.

Moreover, the driving support ECU 10 outputs a first abnormality warning command to the warning ECU 80 at the time point t3. As a result, the warning ECU 80 displays the mark for prompting the holding of the steering wheel SW on the display device 82, and sounds the buzzer 81 at a first cycle. In other words, a warning sound alternatively repeating a sound generation state and a sound stop state at the first cycle is generated by the buzzer 81. This warning to the driver is referred to as "first abnormality warning".

The driving support ECU 10 repeats, at a predetermined calculation cycle, the determination of whether or not the driver has been in the no-driving operation state since the time point t3 at which the preliminary determination that the driver is in the abnormal state is made. When the no-driving operation state has continued for a predetermined period (e.g., 30 seconds), the driving support ECU 10 stops the ACC, which has been carried out until a time point t4 at which the predetermined period has elapsed, and starts first deceleration control. The first deceleration control is control of decelerating the own vehicle at the first target deceleration α1.

Moreover, the driving support ECU 10 outputs a second abnormality warning command to the warning ECU 80 at the time point t4. As a result, the warning ECU 80 displays a message, "Drive vehicle", on the display device 82, and sounds the buzzer 81. This buzzer sound is louder in sound volume than the buzzer sound used by the first abnormality warning, and is sounded at a second cycle shorter than the first cycle. This warning to the driver is referred to as "second abnormality warning". This message may be provided as a sound announcement by using, for example, a speaker (not shown).

When the no-driving operation state has further continued for a predetermined period (e.g., 30 seconds) after the time point t4 at which the second abnormality warning starts, the driving support ECU 10 establishes the determination that the driver is in the abnormal state at a time point t5 at which the predetermined period has elapsed. When the determination of the abnormal state is established, the driving support ECU 10 switches the control mode of the LKA from the "weaker mode" to the "normal mode". Moreover, the driving support ECU 10 switches the deceleration control from the first deceleration control to the second deceleration control. In other words, the driving support ECU 10 switches the target deceleration from the first deceleration $\alpha 1$ to the second deceleration $\alpha 2$, thereby decelerating and stopping the own vehicle. As a result, the own vehicle travels along the target travel line Ld while decelerating. The first deceleration $\alpha 1$ and the second deceleration $\alpha 2$ are the same values as those of the second embodiment.

Moreover, the driving support ECU 10 outputs a decelerate-to-stop warning command to the warning ECU 80 at the time point t5. As a result, the warning ECU 80 displays a message, "Vehicle will stop", on the display device 82, and sounds the buzzer 81. The sound volume of this buzzer sound is louder than the sound volume of the buzzer sound used for the second abnormality warning. This warning to the driver is referred to as "decelerate-to-stop warning". This message may also be provided as a sound announcement by using, for example, a speaker (not shown).

Moreover, the driving support ECU 10 outputs a decelerate-to-stop caution command to the meter ECU 70 at the time point t5. As a result, the meter ECU 70 turns on the stop lamps 72, and flashes the hazard lamps 71.

When the own vehicle is stopped by the second deceleration control in this way, the driving support ECU 10 stops the LKA and the second deceleration control, and outputs a decelerate-to-stop warning finish command to the warning ECU 80. As a result, the decelerate-to-stop warning is finished. The decelerate-to-stop warning may be continued after the own vehicle stops.

Moreover, the driving support ECU 10 outputs a stop lamp turning-off command to the meter ECU 70 when the own vehicle stops. As a result, the stop lamps 72 turn off. In this case, the flashing of the hazard lamps 71 continues.

Further, when the own vehicle stops, the driving support ECU 10 outputs an activation command for the electric parking brake (EPB) to the electric parking brake ECU 50, and outputs an unlock command for the door lock device 91 to the body ECU 90. As a result, the electric parking brake is brought into an activated state, and the door lock device 91 is brought into an unlocked state. Thus, the own vehicle can be stably maintained in the stop state, and it is possible to open the door to rescue the driver. The driving support ECU 10 resets the determination that the driver is in the abnormal state when a predetermined operation set in advance is carried out.

The driving support ECU 10 finishes the hands-free warning, and clears the hands-free continuation period, which has been measured, to zero when the operation on the steering wheel SW is detected (steering torque Tra≠0) under the state where the abnormal-time driving support control processing is carried out, for example, under the state where the hands-free warning is carried out. Moreover, when the driving operation is detected under the state where the first abnormality warning is issued (from time point t3 to time point t4), the driving support ECU 10 sets the abnormality determination made for the driver to "normal", clears the no-operation continuation period, which has been measured, to zero, returns the control mode of the LKA to the "normal mode", and finishes the first abnormality warning.

Moreover, when the driving operation is detected under the state where the second abnormality warning is issued (from time point t4 to time point t5), the driving support ECU 10 sets the abnormality determination made for the driver to "normal", clears the no-operation continuation period, which has been measured, to zero, returns the control mode of the LKA to the "normal mode", and finishes the second abnormality warning. Moreover, the driving support ECU 10 finishes the first deceleration control.

Moreover, the driving support ECU 10 permits driving corresponding to a driving operation before the determination that the driver is in the abnormal state is established. However, after the determination that the driver is in the abnormal state is established (after the time point t5), the driving support ECU 10 continues the second deceleration control to stop the own vehicle even when a driving operation is detected. Thus, even when the accelerator operation by the driver is detected, the driving support ECU 10 invalidates (neglects) an acceleration request that is based on the operation on the accelerator pedal. Moreover, the driving support ECU 10 continues the decelerate-to-stop warning, the turning on of the stop lamps 72, and the flashing of the hazard lamps 71.

With the above-mentioned vehicle control device according to the fourth embodiment, the forms of the deceleration control, the warning to the driver, and the attention attraction from the surroundings are switched as the no-driving operation period increases. Thus, the deceleration control, the warning to the driver, and the attention attraction from the surroundings can appropriately be carried out.

The above-mentioned hands-free warning, first abnormality warning, second abnormality warning, decelerate-to-stop warning, turning on of the stop lamps 72, flashing of the hazard lamps 71, unlocking of the door lock, and activation of the electric parking brake may be also be applied to the first to third embodiments. For example, the hands-free warning is preferably provided in a last half of the period determined in Step S13. Moreover, the first abnormality warning or the second abnormality warning is preferably provided in the period in which the determination in Step S16 is repeated. Moreover, the decelerate-to-stop warning, the turning on of the stop lamps 72, and the flashing of the hazard lamps 71 are preferably carried out in the period in which the determination in Step S21 is repeated. Moreover, when the own vehicle stops (when the determination "Yes" is made in Step S22), the unlocking of the door lock and the activation of the electric parking brake are preferably carried out.

In the above, the driving control device according to the embodiments has been described, but the present invention is not limited to the above-mentioned embodiments and modifications examples, and various changes can be made within the range not departing from the object of the present invention.

For example, the abnormality establishment timing modification example may be applied not only to the second embodiment, but also to the third embodiment and the fourth embodiment. For example, in the third embodiment, the processing in Step S17 and Step S34 illustrated in FIG. 7 only needs to be added between Step S32 and Step S18.

Moreover, according to the respective embodiments, while both the LKA and the ACC are carried out, the abnormal-time driving support control routine is executed, but the ACC does not always need to be carried out.

Moreover, according to the first to third embodiments, even after the determination that the driver is in the abnormal state is established, in Step S21, whether or not the driver is in the no-driving operation state is determined, and when the driving operation is detected, the abnormal-time driving control (deceleration control) is stopped, and the mode is returned to the normal mode, but the processing does not always need to be carried out in this way. For example, the determination processing in Step S21 may be omitted. In other words, as in the fourth embodiment, after the determination that the driver is in the abnormal state is established, the deceleration control may be continued until the own vehicle stops, regardless of the presence/absence of the driving operation.

Moreover, as a modification example of the fourth embodiment, as in the first to third embodiments, even after the determination that the driver is in the abnormal state is established, whether or not the driver is in the no-driving operation state is determined, and when the driving operation is detected, the second deceleration control, the decelerate-to-stop warning, the turning on of the stop lamps 72, and the flashing of the hazard lamps 71 may be stopped, thereby returning the mode to the normal mode.

Moreover, in the respective embodiments, when the driver is preliminarily determined to be in the abnormal state, the control mode of the LKA is set to the "weaker mode", thereby setting the control amount of the LKA to a small value. However, in place of this configuration, the target travel line Ld may be changed so as to be offset in the road width direction by a predetermined distance as long as the own vehicle does not deviate from the lane. For example, when the center position of the left and right white lines is set as the target travel line Ld, the driving support ECU 10 sets the travel line acquired by offsetting the target travel line Ld leftward or rightward by a predetermined distance to a preliminary abnormal-time target travel line. Thus, the own vehicle can be caused to travel in the lane while the performance of the LKA, which causes the own vehicle to travel along the original target travel line Ld, is decreased. With this configuration, the own vehicle no longer travels along the desired travel line for the driver, and the driver, who has neglected the steering wheel operation, can be prompted to carry out the steering wheel operation.

What is claimed is:

1. A vehicle control device including control circuitry, the control circuitry configured to:
   control a vehicle in a first mode by carrying out a lateral control to follow a target travel line;
   determine whether or not a driver of the vehicle is in a preliminary abnormal state based on a period after the driver is determined to be in a hands-free state during the first mode;
   change a control mode from the first mode to a second mode by reducing a lateral control amount when it is determined that the driver is in the preliminary abnormal state;
   determine whether or not the driver of the vehicle is in an abnormal state based on a period after the lateral control amount is reduced; and
   control the vehicle in a third mode by decreasing a speed of the vehicle or by stopping the vehicle when it is determined that the driver is in the abnormal state.

2. A vehicle control device according to claim 1, wherein the control circuitry is configured to decelerate the vehicle at a target deceleration so as to stop the vehicle.

3. A vehicle control device according to claim 1, wherein the first mode and the second mode are control modes of lane keeping assist, respectively.

4. A vehicle control device according to claim 3, wherein the first and second modes are set by an abnormal-time driving support control routine implemented by the control circuitry, and the control circuitry is configured to implement the control mode of the lane keeping assist simultaneously with the abnormal-time driving support control routine.

5. A vehicle control device according to claim 4, wherein:
   the control circuitry is configured to calculate the lateral control amount including: a curvature control amount calculated based on a curvature of a target travel line; a distance difference control amount calculated based on a distance difference in a road width direction between the target travel line and a position of the vehicle; and a yaw angle difference control amount calculated based on a difference angle between a direction of the target travel line and a direction of the vehicle; and
   the control circuitry is configured to decrease the lateral control amount by decreasing the distance difference control amount and the yaw angle difference control amount more than the curvature control amount.

6. A vehicle control device according to claim 5, wherein the control circuitry is configured to decrease the distance difference control amount and the yaw angle difference control amount, and to avoid decreasing the curvature control amount.

7. A vehicle control device according to claim 6, wherein the control circuitry is configured to avoid changing the lateral control amount when a recognition level at which the control circuitry is capable of recognizing the road is equal to or less than a threshold value.

8. A vehicle control device according to claim 3, further comprising:
   lane departure alert means for recognizing the road ahead of the vehicle, calculating a lane departure alert control amount for carrying out driving support for the driver so that the vehicle does not depart from either side of the road, and carrying out steering control for the vehicle based on the lane departure alert control amount; and
   an operation device to be used by the driver to select whether or not each of the control circuitry and the lane departure alert means is to be operated.

9. A vehicle control device according to claim 8, wherein the control circuitry is configured to operate the lane departure alert means and to stop the operation of the control mode of the lane keeping assist when the driver is in the preliminary abnormal state, the control mode of the lane keeping assist is implemented, and the operation of the lane departure alert means is not selected by the driver using the operation device.

10. A vehicle control method, comprising:
   controlling, using control circuitry, a vehicle in a first mode by carrying out a lateral control to follow a target travel line;
   determining whether or not a driver of the vehicle is in a preliminary abnormal state based on a period after the driver is determined to be in a hands-free state during the first mode;
   changing a control mode from the first mode to a second mode by reducing a lateral control amount when it is determined that the driver is in the preliminary abnormal state;

determining whether or not the driver of the vehicle is in an abnormal state based on a period after the lateral control amount is reduced; and controlling the vehicle in a third mode by decreasing a speed of the vehicle or by stopping the vehicle when it is determined that the driver is in the abnormal state.

11. The vehicle control method according to claim 10, further comprising:

decelerating the vehicle at a target deceleration so as to stop the vehicle.

12. A vehicle control method according to claim 10, wherein the first mode and the second mode are control modes of lane keeping assist, respectively.

13. A vehicle control method according to claim 12, wherein the first and second modes are set by an abnormal-time driving support control routine implemented by the control circuitry, and the control mode of the lane keeping assist is implemented simultaneously with the abnormal-time driving support control routine.

14. A vehicle control method according to claim 13, further comprising:

calculating the lateral control amount including: a curvature control amount calculated based on a curvature of a target travel line; a distance difference control amount calculated based on a distance difference in a road width direction between the target travel line and a position of the vehicle; and a yaw angle difference control amount calculated based on a difference angle between a direction of the target travel line and a direction of the vehicle; and decreasing the lateral control amount by decreasing the distance difference control amount and the yaw angle difference control amount more than the curvature control amount.

15. A vehicle control method according to claim 14, further comprising:

decreasing the distance difference control amount and the yaw angle difference control amount; and avoiding decreasing the curvature control amount.

16. A vehicle control method according to claim 15, further comprising:

avoiding changing the lateral control amount when a recognition level at which the control circuitry is capable of recognizing the road is equal to or less than a threshold value.

17. A vehicle control meth according to claim 12, further comprising:

recognizing the road ahead of the vehicle, calculating a lane departure alert control amount for carrying out driving support for the driver so that the vehicle does not depart from either side of the road, and carrying out steering control for the vehicle based on the lane departure alert control amount using lane departure alert means; and selecting, using an operation device, whether or not each of the control circuitry and the lane departure alert means is to be operated.

18. A vehicle control device according to claim 17, further comprising:

operating the lane departure alert means; and stopping the operation of the control mode of the lane keeping assist when the driver is in the preliminary abnormal state, the control mode of the lane keeping assist is implemented, and the operation of the lane departure alert means is not selected by the driver using the operation device.

* * * * *